(12) United States Patent
Wang

(10) Patent No.: US 10,997,725 B2
(45) Date of Patent: May 4, 2021

(54) IMAGE PROCESSING METHOD, IMAGE PROCESSING APPARATUS, AND COMPUTER-PROGRAM PRODUCT

(71) Applicant: BOE Technology Group Co., Ltd., Beijing (CN)

(72) Inventor: Lvwei Wang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/613,066

(22) PCT Filed: Nov. 23, 2018

(86) PCT No.: PCT/CN2018/117177
§ 371 (c)(1),
(2) Date: Nov. 12, 2019

(87) PCT Pub. No.: WO2019/174299
PCT Pub. Date: Sep. 19, 2019

(65) Prior Publication Data
US 2020/0167929 A1 May 28, 2020

(30) Foreign Application Priority Data
Mar. 15, 2018 (CN) .......................... 201810213524.7

(51) Int. Cl.
*G06T 7/11* (2017.01)
*G06T 7/00* (2017.01)

(52) U.S. Cl.
CPC .............. *G06T 7/11* (2017.01); *G06T 7/0012* (2013.01); *G06T 2207/20081* (2013.01); *G06T 2207/20084* (2013.01)

(58) Field of Classification Search
CPC . G06T 2207/20081; G06T 2207/20084; G06T 7/0012; G06T 7/11; G06T 2207/30088; G06T 7/194
See application file for complete search history.

(56) References Cited

U.S. PATENT DOCUMENTS 9,100,307 B2 * 8/2015 Hoctor ................... H04L 47/38
2017/0325286 A1 11/2017 Le et al.
(Continued)

FOREIGN PATENT DOCUMENTS

| CN | 107273870 A | 10/2017 |
| CN | 107464230 A | 12/2017 |
| CN | 107577758 A | 1/2018 |

OTHER PUBLICATIONS

First Office Action in the Chinese Patent Application No. 201810213524.7 dated Jun. 8, 2020; English translation attached.
(Continued)

*Primary Examiner* — Bobbak Safaipour
(74) *Attorney, Agent, or Firm* — Intellectual Valley Law, P.C.

(57) ABSTRACT

An image processing method. The method includes extracting features of an input image using a feature extraction network to generate and output a target feature map of the input image; and constructing and outputting a target mask map of the input image using a mask construction network based on the target feature map. The feature extraction network includes a feature input layer, a feature intermediate layer, and a feature output layer sequentially connected together. The mask construction network includes a mask input layer, a mask intermediate layer, and a mask output layer sequentially connected together. The feature output layer is connected to the mask input layer. The feature intermediate layer is connected to the mask intermediate (Continued)

layer. The feature input layer is connected to the mask output layer.

20 Claims, 11 Drawing Sheets

(56) References Cited

U.S. PATENT DOCUMENTS

2020/0143204 A1\* 5/2020 Nakano ............... G06K 9/4671
2020/0143526 A1  5/2020 Wang et al.

OTHER PUBLICATIONS

Olaf Ronneberger et al., "U-Net: Convolutional Networks for Biomedical Image Segmentation", arXiv:1505.04597v1 [cs.CV] May 18, 2015.
Hiyeonwoo Noh et al., "Learning Deconvolution Network for Semantic Segmentation", 2015 IEEE International Conference on Computer Vision (ICCV), IEEE Xplore, Feb. 18, 2016.
Third Office Action in the Chinese Patent Application No. 201810213524.7 dated Feb. 7, 2021; English translation attached.

\* cited by examiner

FIG. 8

IMAGE PROCESSING METHOD, IMAGE PROCESSING APPARATUS, AND COMPUTER-PROGRAM PRODUCT

CROSS-REFERENCE TO RELATED APPLICATION

This application is a national stage application under 35 U.S.C. § 371 of International Application No. PCT/CN2018/117177, filed Nov. 23, 2018, which claims priority to Chinese Patent Application No. 201810213524.7, filed Mar. 15, 2018, the contents of which are incorporated by reference in the entirety.

TECHNICAL FIELD

The present invention relates to display technology, more particularly, to an image processing method, an image processing apparatus, and a computer-program product.

BACKGROUND

Image segmentation is a technology of partitioning an image into multiple segments having specific and unique characters and extracting target segments from the multiple segments. Medical image segmentation is a part of the technology of image segmentation. Medical image segmentation is a technology of detecting and extracting areas or boundaries of target tissues from medical images, and separating target tissues from other tissues. The technology of medical image segmentation is of great significance to achieve three-dimensional visualization, three-dimensional locating, tissue quantitative analysis, surgical planning and computer aided diagnosis in medical fields.

SUMMARY

In one aspect, the present invention provides an image processing method, comprising extracting features of an input image using a feature extraction network to generate and output a target feature map of the input image; and constructing and outputting a target mask map of the input image using a mask construction network based on the target feature map; wherein the feature extraction network comprises a feature input layer, a feature intermediate layer, and a feature output layer sequentially connected together, the mask construction network comprises a mask input layer, a mask intermediate layer, and a mask output layer sequentially connected together; the feature output layer is connected to the mask input layer; the feature intermediate layer is connected to the mask intermediate layer, and the feature input layer is connected to the mask output layer.

Optionally, the mask intermediate layer comprises an intermediate up-sampling sublayer; and the mask output layer comprises an output up-sampling sublayer.

Optionally, each of the intermediate up-sampling sublayer and the output up-sampling sublayer comprises an un-pooling layer.

Optionally, the feature intermediate layer comprises one or a plurality of feature middle layers sequentially connected together; the mask intermediate layer comprises one or a plurality of mask middle layers sequentially connected together; each of the one or the plurality of feature middle layers comprises one or a plurality of intermediate convolution sublayers and one or a plurality of intermediate down-sampling sublayers sequentially connected together; each of the one or the plurality of mask middle layers comprises one or a plurality of intermediate de-convolution sublayers and one or a plurality of intermediate up-sampling sublayers sequentially connected together; and two corresponding middle layers having a same feature size and respectively from the one or the plurality of feature middle layers and the one or the plurality of mask middle layers are connected to each other.

Optionally, the feature intermediate layer comprises a first feature middle layer; the mask intermediate layer comprises a first mask middle layer, and the first feature middle layer is connected to the first mask middle layer; wherein extracting features of the input image comprises extracting features of the input image using the feature input layer to generate an input feature map and an input convolution feature map; outputting the input feature map to the first feature middle layer; outputting the input convolution feature map to the mask output layer, extracting feature of the input feature map using the first feature middle layer to generate a first intermediate feature map and a first intermediate convolution feature map; outputting the first intermediate feature map to the feature output layer; outputting the first intermediate convolution feature map to the first mask middle layer; extracting features of the first intermediate feature map using the feature output layer to generate the target feature map; and outputting the target feature map to the mask input layer.

Optionally, the mask input layer comprising an input de-convolution sublayer; the method comprises performing a mask construction operation on the target feature map using the input de-convolution sublayer to generate an input mask map, the mask construction operation comprising a de-convolution operation and a channel reduction operation; and outputting the input mask map to the first mask middle layer.

Optionally, the image processing method further comprises constructing a first intermediate mask map using the first mask middle layer based on the first intermediate convolution feature map and the input mask map; and outputting the first intermediate mask map to the mask output layer.

Optionally, the first mask middle layer comprises a first intermediate de-convolution sublayer, a second intermediate de-convolution sublayer, and an intermediate up-sampling sublayer, wherein the method comprises performing an up-sampling operation on the input mask map using the intermediate up-sampling sublayer; performing a mask construction operation on the first intermediate convolution feature map and an output from the intermediate up-sampling sublayer using the first intermediate de-convolution sublayer, and performing a mask construction operation on an output from the first intermediate de-convolution sublayer using the second intermediate de-convolution sublayer to generate the first intermediate mask map.

Optionally, the image processing method further comprises constructing and outputting the target mask map of the input image using the mask output layer based on the input convolution feature map and the first intermediate mask map.

Optionally, the mask output layer comprises a first output de-convolution sublayer, a second output de-convolution sublayer, a third output de-convolution sublayer, and an output up-sampling sublayer; the method comprising performing an up-sampling operation on the first intermediate mask map using the output up-sampling sublayer; performing a mask construction operation on the input convolution feature map using the first output de-convolution sublayer; performing a mask construction operation on an output from the output up-sampling sublayer using the first output de-convolution sublayer; performing a mask construction operation on an output from the first output do-convolution sublayer using the second output de-convolution sublayer; performing a mask construction operation on an output from the second output de-convolution sublayer using the third output de-convolution sublayer, thereby obtaining the target mask map; and outputting the target mask map.

Optionally, the mask construction operation further comprises an activation operation.

Optionally, the feature input layer comprises a first input convolution sublayer, a second input convolution sublayer, and an input down-sampling sublayer; the method comprising performing a first feature extraction operation on the input image using the first input convolution sublayer; performing a second feature extraction operation on an output from the first input convolution sublayer using the second input convolution sublayer to generate the input convolution feature map; outputting the input convolution feature map to the mask output layer; performing a down-sampling operation on the input convolution feature map using the input down-sampling sublayer to generate the input feature map; and outputting the input feature map to the first feature middle layer of the feature intermediate layer, wherein the first feature extraction operation comprises a convolution operation and a channel addition operation; and the second feature extraction operation comprises a convolution operation.

Optionally, the input image and the input convolution feature map have a same size.

Optionally, the first feature middle layer comprises a first intermediate convolution sublayer, a second intermediate convolution sublayer, and an intermediate down-sampling sublayer; the method comprising performing the first feature extraction operation on the input feature map using the first intermediate convolution sublayer, performing the second feature extraction operation on an output from the first intermediate convolution sublayer using the second intermediate convolution sublayer to generate the first intermediate convolution feature map; outputting the first intermediate convolution feature map to the first mask middle layer, performing a down-sampling operation on the first intermediate convolution feature map using the intermediate down-sampling sublayer to generate the first intermediate feature map; and outputting the first intermediate feature map to the feature output layer.

Optionally, the input feature map and the first intermediate convolution feature map have a same size.

Optionally, the feature output layer comprises an output convolution sublayer, the method comprising performing the first feature extraction operation on the first intermediate feature map using the output convolution sublayer to generate the target feature map; and outputting the target feature map to the mask input layer.

Optionally, the first intermediate feature map and the target feature map have a same size.

Optionally, each of the first feature extraction operation and the second feature extraction operation further comprises an activation operation.

Optionally, the mask intermediate layer comprises a first mask middle layer, a second mask middle layer, a third mask middle layer, and a fourth mask middle layer, sequentially connected together, the feature intermediate layer comprises a first feature middle layer, a second feature middle layer, a third feature middle layer, and a fourth feature middle layer, sequentially connected together; and the first mask middle layer, the second mask middle layer, the third mask middle layer, and the fourth mask middle layer are respectively connected to the first feature middle layer, the second feature middle layer, the third feature middle layer, and the fourth feature middle layer.

Optionally, the image processing method further comprises extracting features of the input image using the feature input layer to generate an input feature map; outputting the input feature map to the first feature middle layer; extracting features of the input feature map using the first feature middle layer to generate a first intermediate feature map and a first intermediate convolution feature map; outputting the first intermediate feature map to the second feature middle layer; outputting the first intermediate convolution feature map to the first mask middle layer; extracting features of the first intermediate feature map using the second feature middle layer to generate a second intermediate feature map and a second intermediate convolution feature map; outputting the second intermediate feature map to the third feature middle layer; outputting the second intermediate convolution feature map to the second mask middle layer; extracting features of the second intermediate feature map using the third feature middle layer to generate a third intermediate feature map and a third intermediate convolution feature map; outputting the third intermediate feature map to the fourth feature middle layer, outputting the third intermediate convolution feature map to the third mask middle layer; extracting features of the third intermediate feature map using the fourth feature middle layer to generate a fourth intermediate feature map and a fourth intermediate convolution feature map; outputting the fourth intermediate feature map to the feature output layer, outputting the fourth intermediate convolution feature map to the fourth mask middle layer; extracting features of the fourth intermediate feature map using the feature output layer to generate the target feature map; outputting the target feature map to the mask input layer; constructing an input mask map using the mask input layer based on the target feature map; outputting the input mask map to the fourth mask middle layer; constructing a fourth intermediate mask map using the fourth mask middle layer based on the fourth intermediate convolution feature map and the input mask map; outputting the fourth intermediate mask map to the third mask middle layer; constructing a third intermediate mask map using the third mask middle layer based on the third intermediate convolution feature map and the fourth intermediate mask map; outputting the third intermediate mask map to the second mask middle layer; constructing a second intermediate mask map using the second mask middle layer based on the second intermediate convolution feature map and the third intermediate mask map; outputting the second intermediate mask map to the first mask middle layer, constructing a first intermediate mask map using the first mask middle layer based on the first intermediate convolution feature map and the second intermediate mask map; and outputting the first intermediate mask map to the mask output layer.

Optionally, the image processing method further comprises training the feature extraction network and the mask construction network using reference images and reference mask maps corresponding to the reference images; wherein a loss function for training the feature extraction network and the mask construction network comprising one or a combination of a Dyce similarity coefficient function and an intersection ratio function.

In another aspect, the present invention provides an image processing apparatus, comprising a memory; and one or more processors; wherein the memory and the one or more processors are connected with each other; and the memory stores computer-executable instructions for controlling the one or more processors to extract features of an input image using a feature extraction network to generate and output a target feature map of the input image; and construct and outputting a target mask map of the input image using a mask construction network based on the target feature map; wherein the feature extraction network comprises a feature input layer, a feature intermediate layer, and a feature output layer sequentially connected together; the mask construction network comprises a mask input layer, a mask intermediate layer, and a mask output layer sequentially connected together; the feature output layer is connected to the mask input layer, the feature intermediate layer is connected to the mask intermediate layer; and the feature input layer is connected to the mask output layer.

In another aspect, the present invention provides a computer-program product comprising a non-transitory tangible computer-readable medium having computer-readable instructions thereon, the computer-readable instructions being executable by a processor to cause the processor to perform extracting features of an input image using a feature extraction network to generate and output a target feature map of the input image; and constructing and outputting a target mask map of the input image using a mask construction network based on the target feature map; wherein the feature extraction network comprises a feature input layer, a feature intermediate layer, and a feature output layer sequentially connected together, the mask construction network comprises a mask input layer, a mask intermediate layer, and a mask output layer sequentially connected together; the feature output layer is connected to the mask input layer; the feature intermediate layer is connected to the mask intermediate layer, and the feature input layer is connected to the mask output layer.

BRIEF DESCRIPTION OF THE FIGURES

The following drawings are merely examples for illustrative purposes according to various disclosed embodiments and are not intended to limit the scope of the present invention.

FIG. 8 is a schematic diagram illustrating a padding operation in some embodiments according to the present disclosure.

DETAILED DESCRIPTION

Figure 1:
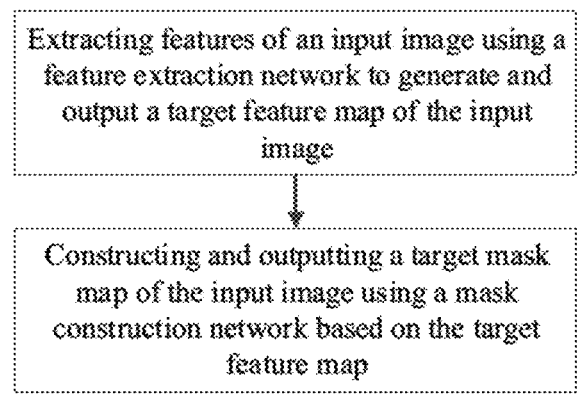
FIG. 1 is a flow chat illustrating an image processing method in some embodiments according to the present disclosure.

The disclosure will now be described more specifically with reference to the following embodiments. It is to be noted that the following descriptions of some embodiments are presented herein for purpose of illustration and description only. It is not intended to be exhaustive or to be limited to the precise form disclosed.

Various methods can be used in medical image segmentation, such as voxel-based segmentation methods, region-based segmentation methods, registration-based segmentation methods, and segmentation methods based on artificial intelligence. The segmentation methods based on artificial intelligence may adopt neural network to perform segmentation process, which has high image segmentation accuracy and good repeatability.

Accordingly, the present disclosure provides, inter alia to an image processing method, an image processing apparatus, and a computer-program product that substantially obviate one or more of the problems due to limitations and disadvantages of the related art. In one aspect, the present disclosure provides an image processing method. In some embodiments, the method includes extracting features of an input image using a feature extraction network to generate and output a target feature map of the input image; and constructing and outputting a target mask map of the input image using a mask construction network based on the target feature map. Optionally, the feature extraction network includes a feature input layer, a feature intermediate layer, and a feature output layer sequentially connected together. Optionally, the mask construction network includes a mask input layer, a mask intermediate layer, and a mask output layer sequentially connected together. Optionally, the feature output layer is connected to the mask input layer. Optionally, the feature intermediate layer is connected to the mask intermediate layer. Optionally, the feature input layer is connected to the mask output layer. Optionally, the mask intermediate layer includes an intermediate up-sampling sublayer. Optionally, the mask output layer includes an output up-sampling sublayer. Optionally, each of the intermediate up-sampling sublayer and the output up-sampling sublayer includes an un-pooling layer. The present disclosure provides an image processing method based on neural networks segmentation, guaranteeing the accuracy of the image, improving the image segmentation speed, reducing the amount of memory used, and solving the problem of insufficient medical resources. For example, using full convolutional neural network, the full convolutional neural network doesn't have a fully connected layer, which ensures accuracy as well as enhances the image segmentation speed.

As used herein, the term "feature" generally refers to information about an image or a portion of an image, including any localized optical characteristic in an image, e.g. a spot, a line, or a pattern. In one exemplary instance, a feature takes the form of spatial information defined by a vector and/or integer.

As used herein, the term "mask" refers to a set of pixels reflecting an object in an image (e.g., a digital image).

In medical area, a deep learning neural network can be used in medical image segmentation to improve the accuracy of image segmentation, to reduce the time for extracting features, and to improve computational efficiency. Medical image segmentation can be used to extract target regions for the convenience of analyzing and identifying a medical image. Medical image segmentation can also be used for three-dimensional reconstruction and visualization of a medical image. The present disclosure can be applied not only in the medical area, but also in other area in need of image segmentation, image reconstruction, and so on.

FIG. 1 is a flow chat illustrating an image processing method in some embodiments according to the present disclosure. Referring to FIG. 1, in some embodiments, in an image processing method, a neural network includes a feature extraction network and a mask construction network. Optionally, the feature extraction network is used to extract feature maps. Optionally, the mask construction network is used to generate mask maps. For example, the mask maps include maps of target areas separated from input images. For example, the mask maps may be a portion of a pathological image showing target lesion areas, a portion of a pathological image showing target lesion organs, etc. In some embodiments, the image processing method includes obtaining an input image; extracting features of an input image using the feature extraction network to generate and output a target feature map of the input image; constructing and outputting a target mask map of the input image using the mask construction network based on the target feature map.

Various appropriate images may be obtained as the input image. Examples of suitable input images include medical images. Optionally, medical images include, but not limited to, ultrasound images, images from Computed Tomography (CT), images from Magnetic Resonance Imaging (MRI), images from Digital Subtraction Angiography (DSA), images from Positron Emission Computed Tomography (PET). Optionally, medial images include, but not limited to, brain magnetic resonance images, spinal MRI images, fundus images, blood vessel images, pancreatic CT images, and lung CT images.

Various appropriate devices may be used to obtain the input image. Examples of devices suitable to obtain the input image include, but not limited to, ultrasound equipment, X-ray equipment, nuclear magnetic resonance equipment, nuclear medicine equipment, medical optical equipment, and thermal imaging equipment.

Optionally, the input image can be a human image, an animal image, a plant image, or a landscape image. Optionally, the input image can be a grayscale image. Optionally, the input image can be a color image. Optionally, the size of the input image can be 192×256. Optionally, the size of the input image can be 512×512. Optionally, the input image is a raw image obtained directly by an image obtainer. Optionally, the input image is a processed image obtained after a pretreatment is performed on the raw image.

In some embodiments, in order to prevent the accuracy of image segmentation from being influenced by the poor quality of the input image or by the unbalanced data of the input image, the image processing method further includes performing a pretreatment on the initial image before obtaining the input image. The pretreatment can eliminate irrelevant or noise information from the initial image, allowing the input image to be easily segmented. Optionally, the pretreatment includes data augmentation, and data scaling. Various appropriate methods may be used to perform data augmentation of an image to increase the diversity of the input image, and to reduce the overfitting phenomenon during image processing. Examples of appropriate methods used to perform data augmentation of an image include, but not limited to, random cropping an image, rotating an image, flipping an image, skewing an image, adjusting brightness of an image, adjusting contrast of an image. Optionally, image scaling includes proportional scaling an image, and scaling an image to a specific size (e.g. 192×256). Optionally, the pretreatment further includes Gamma correction, image enhancement, and noise reduction filtering.

Figure 2A:
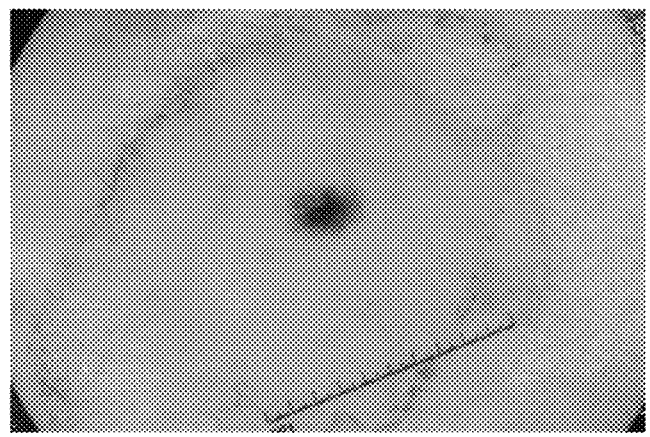
FIG. 2A is a schematic diagram of an initial image in some embodiments according to the present disclosure.
Figure 2B:
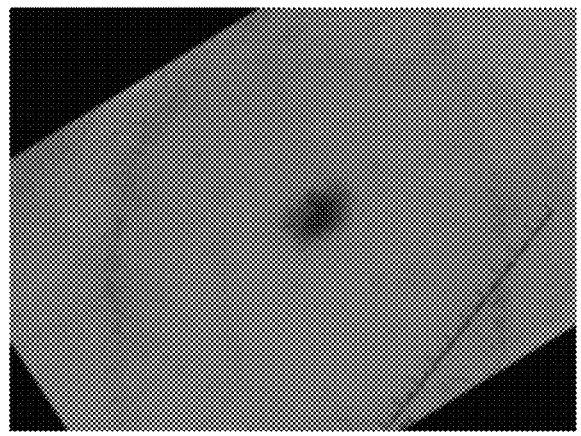
FIG. 2B is a schematic diagram of an input image obtained after a pretreatment is performed on an initial image in some embodiments according to the present disclosure.

FIG. 2A is a schematic diagram of an initial image in some embodiments according to the present disclosure. FIG. 2B is a schematic diagram of an input image obtained after a pretreatment is performed on an initial image in some embodiments according to the present disclosure. Referring to both FIG. 2A and FIG. 2B, FIG. 2A is an initial image. FIG. 2B is an input image obtained after the pretreatment is performed on the initial image. Various appropriate methods may be used in a pretreatment. Examples of methods to be used in a pretreatments include, but not limited to, random rotating an image, skewing an image, adjusting color of an image, adjusting contrast of an image, and adjusting brightness of an image.

In some embodiments, a segmentation is performed on the input image to segment a shape of an object (e.g. an organ, or a tissue), the target mask map may include only one feature channel. Optionally, a segmentation is performed on the input image to segment shapes of a plurality of objects, the target mask map includes a plurality of feature channels. For example, a segmentation is performed on the input image to segment shapes of two objects, the target mask map may include three feature channels including two of the three feature channels for two respective objects, and the remaining one of the three feature channels for backgrounds. Optionally, in order to improve efficiency of image segmentation, the plurality of feature channels are three feature channels corresponding to Red, Green, Blue color images separated from the input image. For example, in order to improve efficiency of image segmentation, a group of features used in feature construction and target mask is generated on each respective feature channel of the three channels.

In some embodiments, the feature extraction network and the mask construction network are convolutional neural network (CNN) including convolution and deconvolution. Optionally, a convolution operation can adopt various available convolution methods. Optionally, a deconvolution operation can adopt full convolution to enlarge the definition domain to achieve deconvolution. Optionally, the deconvolution operation can adopt pooling index to enlarge space, followed by a convolution padding to achieve deconvolution.

Various appropriate algorithms may be adopted by the feature extraction network and mask construction network. Examples of appropriate algorithms adopted by the feature extraction network and mask construction network include, but not limited to, Full Convolutional Neural Network (FCN), Segmented Network (SegNet), Dilated Convolutions, Deep Neural Network DeepLab (V1 & V2) based on Atrous Convolution, Deep Neural Network DeepLab (V3) based on Atrous Spatial Pyramid Pooling, multi-channel segmentation neural network (RefineNet).

Figure 3A:
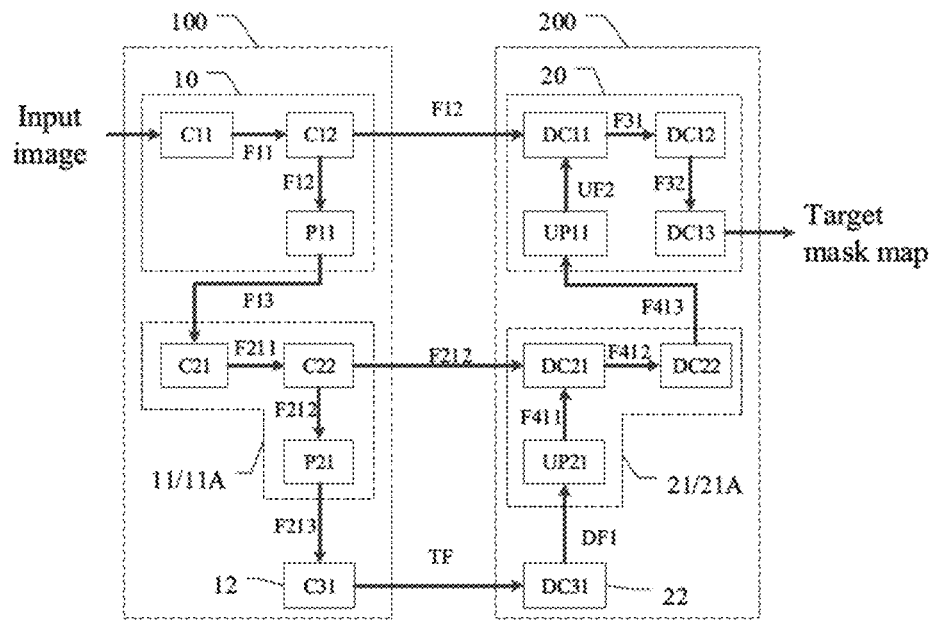
FIG. 3A is a schematic diagram of structures of a feature extraction network and a mask construction network in some embodiments according to the present disclosure.

FIG. 3A is a schematic diagram of structures of a feature extraction network and a mask construction network in some embodiments according to the present disclosure. Referring to FIG. 3A, in some embodiments, the feature extraction network 100 includes a feature input layer 10, a feature intermediate layer 11, and a feature output layer 12 sequentially connected together. Optionally, the feature extraction network 100 is used to generate a target feature map of the input image. The feature extraction network 100 is used to extract features information of the input image. In some embodiments, the mask construction network 200 includes a mask input layer 22, a mask intermediate layer 21, and a mask output layer 20 sequentially connected together. Optionally, the mask construction network 200 is used to construct a target mask map of the input image based on the target feature map of the input image.

In some embodiments, the feature extraction network 100 is connected to the respective mask construction network 200. Optionally, a layer of the feature extraction network 100 is connected to a corresponding layer of the respective mask construction network 200. In one example, the feature output layer 12 is connected to the mask input layer 22. In another example, the feature intermediate layer 11 is connected to the mask intermediate layer 21. In another example, the feature input layer 10 is connected to the mask output layer 20. As used herein, the term "connect" refers to any appropriate connection between layers, including a concatenate connection. As used herein, the term "concatenate connection" refers to connecting features of a substantially same size respectively from layers that are connected with each other (e.g., layers that are connected with each other and respectively from the feature extraction network 100 and the mask construction network 200), for example, by means of memory mapping. Vectors having features corresponding to each other can be combined by concatenate connection, doubling the number of channels of the layer containing the features.

In some embodiments, the feature intermediate layer 11 includes one or a plurality of feature middle layers sequentially connected together. Optionally, each of the one or the plurality of feature middle layers includes one or a plurality of intermediate convolution sublayers and one or a plurality of intermediate down-sampling sublayers sequentially connected together. In some embodiments, the mask intermediate layer includes one or a plurality of mask middle layers sequentially connected together. Optionally, each of the one or the plurality of mask middle layers includes one or a plurality of intermediate de-convolution sublayers and one or a plurality of intermediate up-sampling sublayers sequentially connected together. In some embodiments, two corresponding middle layers having a same feature size and respectively from the one or the plurality of feature middle layers and the one or the plurality of mask middle layers are connected to each other.

In some embodiments, referring to FIG. 3A, the feature intermediate layer 11 includes a first feature middle layer 11A. The mask intermediate layer 21 includes a first mask middle layer 21A. Optionally, the feature output layer 12 is connected to the mask input layer 22. Optionally, the first feature middles layer 11A is connected to the first mask middles layer 21A. Optionally, the feature input layer 10 is connected to the mask output layer 20. Optionally, the mask output layer 20 receives an input convolution feature map F12 sent from the feature input layer 10. Optionally, the first mask middle layer 21A receives a first intermediate convolution feature map F212 sent from the first feature middle layer 11A. Optionally, the mask input layer 22 receives a target feature map TF sent from the feature output layer 12.

Figure 4:
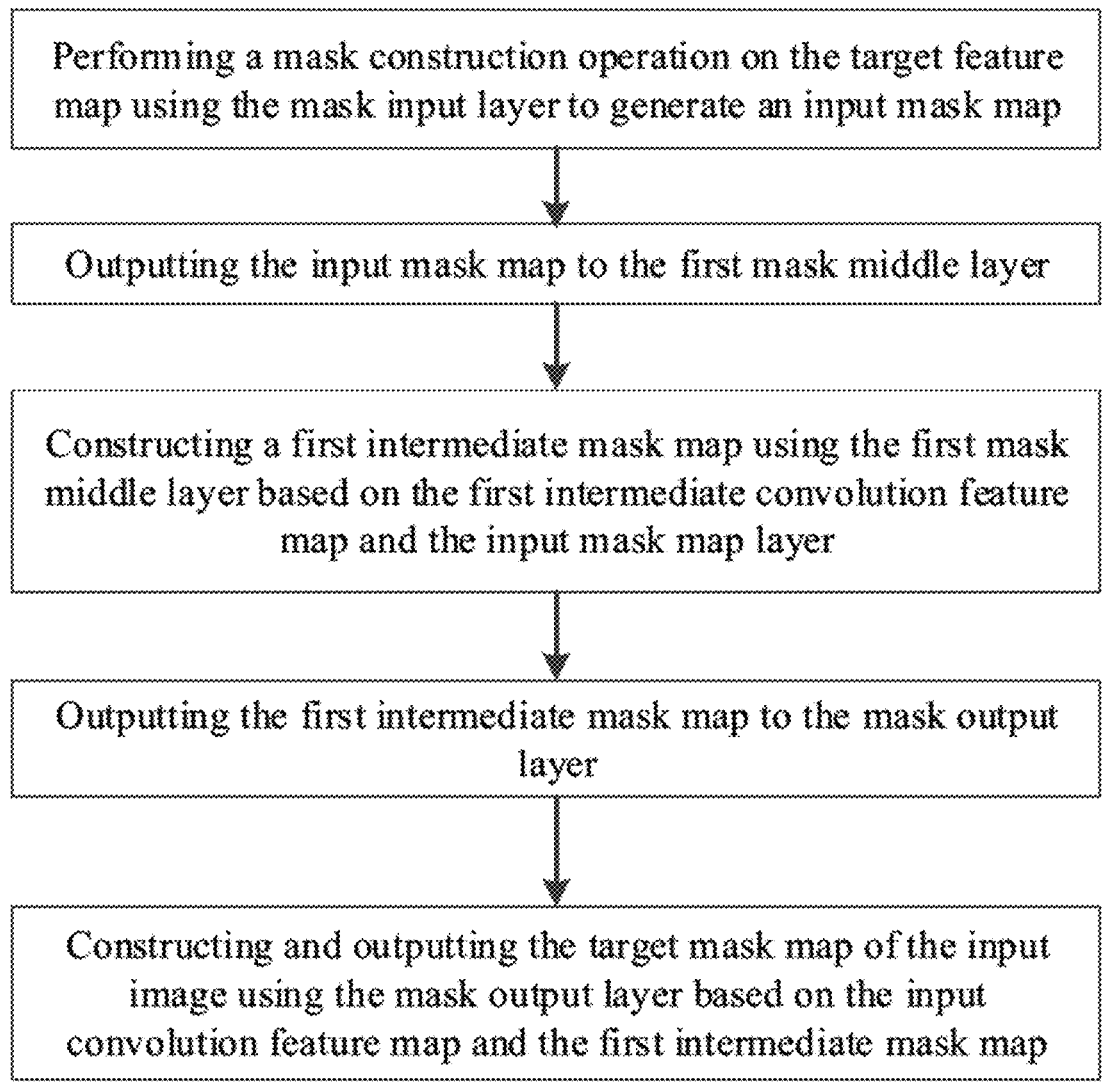
FIG. 4 is a flow chat illustrating an image processing method in some embodiments according to the present disclosure.

FIG. 4 is a flow chat illustrating an image processing method in some embodiments according to the present disclosure. Referring to FIG. 4, an image processing method includes performing a mask construction operation on the target feature map using the mask input layer to generate an input mask map; outputting the input mask map to the first mask middle layer; constructing a first intermediate mask map using the first mask middle layer based on the first intermediate convolution feature map and the input mask map layer; Outputting the first intermediate mask map to the mask output layer; and constructing and outputting the target mask map of the input image using the mask output layer based on the input convolution feature map and the first intermediate mask map.

In some embodiments, referring to FIG. 3A, the mask output layer 20 includes an output up-sampling sublayer UP11, a first output de-convolution sublayer DC11, a second output de-convolution sublayer DC12, and a third output de-convolution sublayer DC13 sequentially connected together. The first mask middle layer 21A includes an intermediate up-sampling sublayer UP21, a first intermediate de-convolution sublayer DC21, and a second intermediate de-convolution sublayer DC22 sequentially connected together. The mask input layer 22 includes an input de-convolution sublayer DC31.

In some embodiments, the mask construction network 200 constructs target mask map of the input image using de-convolution sublayers to obtain a more accurate target mask map of the input image and to have a better effect of image segmentation.

Various appropriate methods of image feature extraction and methods of mask construction may be used in the present disclosure. Examples of appropriate methods of image feature extraction include, but not limited to, obtaining features of an image using convolution operation. Example of appropriate methods of mask construction include, but not limited to, constructing a target mask map of the input image using de-convolution operation.

In some embodiments, convolution sublayers are used to perform convolution operation, and deconvolution sublayers are used to perform de-convolution operation. In some embodiments, the forward propagation process of the convolution sublayers corresponds to the back propagation process of the de-convolution operation, and the back propagation process of the convolution sublayers corresponds to the forward propagation process of the de-convolution operation. Visual images can be generated when the de-convolution operation is performed on the feature maps generated from layers of the feature extraction network. The de-convolution operation can transform feature information of an image from a feature map domain to a pixel domain. For example, a de-convolution operation can be performed on a feature map outputted from a convolution sublayer. The result of the de-convolution operation may show feature information extracted by the convolution sublayer. In one example, a convolution sublayer may extract feature information of an input image (e.g. the size of the input image is 227×227) and obtain a feature map (e.g. the size of the feature map is 13×13). In order to check the feature information extracted from the convolution sublayer, the feature map should be outputted from the convolution sublayer to a de-convolution sublayer. Subsequently, operations including an un-pooling operation, a de-activation operation, and a de-convolution operation are performed on the feature map. The size (e.g. 13×13) of the feature map outputted from the convolution sublayer is enlarged to obtain an output image (e.g. having a size of 227×227). The output image and the input image have a same size (e.g. 227×227). The output image shows the feature information extracted by the convolution layer.

Referring to FIG. 3A, in some embodiments, the de-convolution layer includes the first output de-convolution sublayer DC11, the second output de-convolution sublayer DC12, the third output de-convolution sublayer DC13, the first intermediate de-convolution sublayer DC21, the second intermediate de-convolution sublayer DC22, and the input de-convolution sublayer DC31.

In some embodiments, referring to FIG. 4, performing the mask construction operation on the target feature map using the mask input layer to generate the input mask map further includes performing a mask construction on the target feature map using the input de-convolution sublayer of the mask input layer to obtain the input mask map. Subsequently, the input mask map is outputted to the first mask middle layer. Optionally, the mask construction operation includes channel reduction operation.

Figure 5:
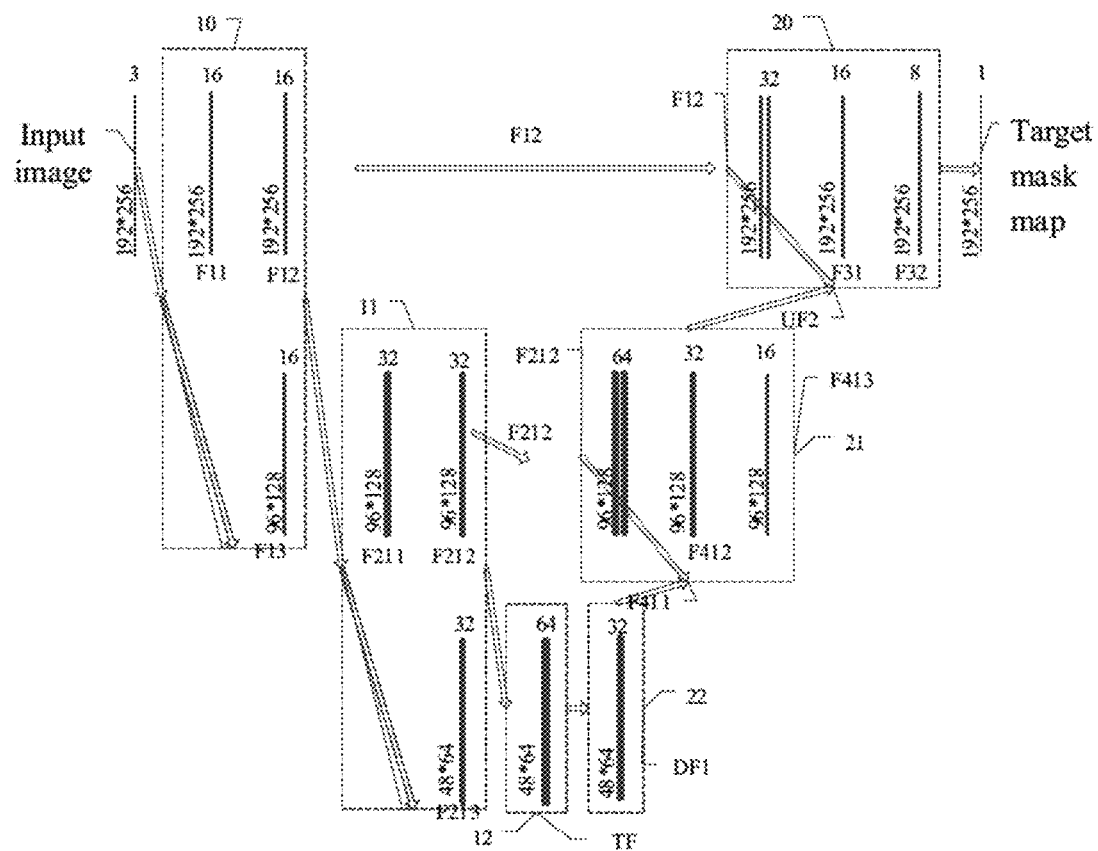
FIG. 5 is a schematic diagram illustrating a change of feature channels in some embodiments according to the present disclosure.

FIG. 5 is a schematic diagram illustrating a change of feature channels in some embodiments according to the present disclosure. Referring to both FIG. 3A and FIG. 5, in some embodiments, the target feature map TF outputted from the feature output layer 12 includes 64 feature channels. Optionally, a channel reduction operation is performed on the target feature map TF by the input de-convolution sublayer DC31 to obtain an input mask map DF1. For example, the number of feature channels of the target feature map TF is halved by the input de-convolution sublayer DC31 from 64 to 32. The number of feature channels of the input mask map DF1 is 32.

In some embodiments, in the mask construction network 200, a feature channel of the mask construction network 200 represents a respective sub-mask map. In the feature extraction network 100, a feature channel of the feature extraction network 100 represents a respective sub-feature map. For example, when the number of feature channels of the target feature map TF is 64, the target feature map TF includes 64 sub-feature maps. When the number of feature channels of the input mask map DF1 is 32, the input mask map DF1 includes 32 sub-mask maps. A sub-mask map represents the result of a de-convolution operation performed on an image, a sub-feature map represents the result of a convolution operation performed on an image.

Referring to FIG. 3A and FIG. 5, in some embodiments, when the number of feature channels of the input mask DF1 is 32, the input de-convolution sublayer DC31 can construct and output 32 sub-mask maps, and the input mask map DF1 includes the 32 sub-mask maps.

In some embodiments, the mask construction operation further includes de-convolution operation. Optionally, in the de-convolution operation, a convolution kernel of the de-convolution operation is a 3×3 matrix. Optionally, the stride of the convolution kernel is 1, and the padding of the convolution kernel is 1. As used herein, the term "padding" refers to adding additional data to a mask map. The numbers of padding in the context of this disclosure refers to the numbers of rows and the numbers of columns added to the mask map. When the padding of the convolution kernel is N, it means N rows of data being added to each of the top end and the bottom end of the mask map, and N columns of data being added to each of the left end and the right end of the mask map. For example, "the padding of the convolution kernel is 1" means that 1 row of data being added to each of the top end and the bottom end of a mask map, and 1 column of data being added to each of the left end and the right end of the mask map. For example, a size of a mask map is 48×64. Subsequent to performing a padding operation on the mask map, the size of the mask map becomes 50×66. Optionally, subsequent to performing the de-convolution operation on the target feature map TF using the input de-convolution sublayer DC31, the input mask map DF1 is outputted from the input de-convolution sublayer DC31. The input mask map DF1 and target feature map TF has a same size. For example, the size of the target feature map TF is 48×64, the size of the input mask map DF1 outputted from the input de-convolution sublayer DC31 is also 48×64.

In some embodiments, each of the intermediate up-sampling sublayer UP21 and the output up-sampling sublayer UP11 includes an un-pooling layer. The un-pooling layer performs an un-pooling operation. Optionally, the un-pooling layer can increase the value of each dimension of a mask map and increase the amount of data of the mask map. The increasing amount of data of the mask map is used to perform image reconstruction. Optionally, the mask construction network 200 performs up sampling operation using the un-pooling layer, reducing the redundant computation, improving calculation speed of the neural network, and reducing the memory usage.

Figure 6:
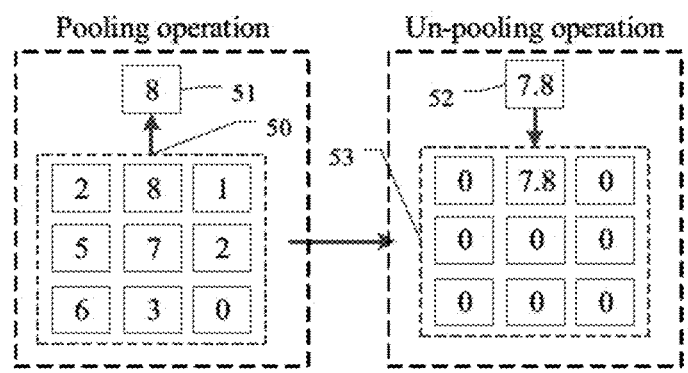
FIG. 6 is a schematic diagram illustrating a pooling operation and an un-pooling operation in some embodiments according to the present disclosure.

FIG. 6 is a schematic diagram illustrating a pooling operation and an un-pooling operation in some embodiments according to the present disclosure. Referring to FIG. 6, the left part of FIG. 6 shows the pooling operation, and the right part of the FIG. 6 shows the un-pooling operation. The pooling operation includes a down-sampling operation. The un-pooling operation includes an up-sampling operation. The un-pooling operation needs parameters obtained from a corresponding pooling operation, such as a coordinate of maximum value of an input image. In one example, in a pooling operation, a size of a first input image 50 is 3×3, the coordinate of a pixel having maximum value in the first input image 50 is (0, 1), and the maximum value of the first input image 50 is 8. Optionally, the pooling operation adopts a method of max-pooling, and a down-sampling factor is a 3×3 matrix. Subsequent to the pooling operation, a first output image 51 is obtained. The size of the first output image 51 is 1×1. The value of the pixel of the first output image 51 is 8. In another example, in an un-pooling operation, a size of a second input image 52 is 1×1, and the size of the second input image 52 should be enlarged to a size of 3×3. An up-sampling factor of the un-pooling operation can be a 3×3 matrix. During the un-pooling operation, a coordinate of the pixel having the maximum value in an input image in the corresponding pooling operation should be obtained (e.g. the coordinate of the pixel having the maximum value in an input image is (0,1)). Subsequently, a pixel having the coordinate of (0, 1) is filled with a maximum activation value (e.g. 7.8), and the remaining pixels are filled with 0, to obtain a second output image 53. The size of the second output image 53 is 3×3.

Various appropriate algorithms may be adopted by the intermediate up-sampling sublayer and the output up-sampling sublayer. Examples of appropriate algorithms adopted by the intermediate up-sampling sublayer and the output up-sampling sublayer include, but not limited to, strides transposed convolution, and interpolation. Optionally, interpolation includes interpolated values, two cubic interpolations.

Referring to FIG. 4, in some embodiments, constructing the first intermediate mask map using the first mask middle layer based on the first intermediate convolution feature map and the input mask map layer includes performing an up-sampling operation on the input mask map using an intermediate up-sampling sublayer of the first mask middle layer; performing a mask construction operation on the first intermediate convolution feature map and an output from the intermediate up-sampling sublayer using the first intermediate de-convolution sublayer. For example, the first intermediate convolution feature map and the first mask middle layer are concatenated together, and a mask construction operation is performed on the data of the combination of the first intermediate convolution feature map and the first mask middle layer. In some embodiments, constructing a first intermediate mask map using the first mask middle layer based on the first intermediate convolution feature map and the input mask map layer further includes performing a mask construction operation on the output from the first intermediate de-convolution sublayer of the first mask middle layer using the second intermediate de-convolution sublayer of the first mask middles layer; and obtaining the first intermediate mask map.

Referring to FIG. 3A, in some embodiments, an up-sampling operation is performed on the input mask map DF1 by the intermediate up-sampling sublayer UP21 of the first mask middles layer 21A, obtaining a mask map F411. Referring to FIG. 5, in some embodiments, an up-sampling factor of the up-sampling operation is 2×2, the stride of the up-sampling operation is 2. For example, if the size of the input mask map DF1 is 48×64, the size of the mask map F411 is 96×128. The number of feature channels of the input mask map DF1 is 32, and the number of feature channels of the mask map F411 is also 32. The size of the mask map F411 is four times the size of the input mask map DF1. The number of pixels of the mask map F411 is four times the number of pixels of the input mask DF1.

In some embodiments, the first intermediate de-convolution sublayer DC21 of the first mask middles layer 21A receives the first intermediate convolution feature map F212 and the output (e.g. the mask map F411) of the intermediate up-sampling sublayer UP21 of the first mask middle layer 21A. Optionally, a mask construction operation is performed on the combination of the first intermediate convolution feature map F212 and the mask map F411, obtaining a mask map F412. Optionally, the mask construction operation includes a de-convolution operation and a channel reduction operation. In one example, the number of feature channels of the mask map F412 is a half of the value of the sum of the number of feature channels of the first intermediate convolution feature map F212 and the number of feature channels of mask map F411. In another example, referring to FIG. 5, the number of feature channels of the first intermediate convolution feature map F212 is 32. The number of feature channels of the mask map F411 is 32. Therefore, the number of feature channels of the mask map F412 is 32 which is a half of the value of the sum of the number of feature channels of the first intermediate convolution feature map F212 and the number of feature channels of the mask map F411. Optionally, a mask construction operation will not change a size of an image, and the first intermediate convolution feature map F212, the mask map F411, and the mask map F412 have a same size, e.g. 96×128.

Referring to FIG. 3A, in some embodiments, a mask construction operation is performed on the output (e.g. the mask map F412) from the first intermediate de-convolution sublayer DC21 of the first mask middle layer 21A by the second intermediate de-convolution sublayer DC22 of the first mask middle layer 21A, obtaining a first intermediate mask map F413. Optionally, referring to FIG. 5, the number of feature channels of the mask map F412 is 32, and the number of feature channels of the first intermediate mask map F413 is 16. The mask map F412 and the first intermediate mask map F413 have a same size, e.g. 96×128.

Referring to FIG. 4, in some embodiments, constructing and outputting the target mask map of the input image using the mask output layer based on the input convolution feature map and the first intermediate mask map includes performing an up-sampling operation on the first intermediate mask map using the output up-sampling sublayer; and performing a mask construction operation on a combination of the input convolution feature map and an output up-sampling sublayer using the first output de-convolution sublayer. For example, the input convolution feature map and the output from the output up-sampling sublayer are concatenated, and the mask construction operation is performed on the data of the combination of the input convolution feature map and the output from the output up-sampling sublayer. In some embodiments, constructing and outputting the target mask map of the input image using the mask output layer based on the input convolution feature map and the first intermediate mask map further includes performing a mask construction operation on an output from the first output de-convolution sublayer using the second output de-convolution sublayer, performing a mask construction operation on an output from the second output de-convolution sublayer using the third output de-convolution sublayer; and obtaining and outputting the target mask map of the input image.

Referring to FIG. 3A and FIG. 5, in some embodiments, an up-sampling operation is performed on the first intermediate mask map F413 by output up-sampling sublayer UP11. Optionally, the up-sampling operation of the process of constructing the first intermediate mask map using the first mask middle layer based on the first intermediate convolution feature map and the input mask map layer is the same as the up-sampling operation of the process of constructing and outputting the target mask map of the input image using the mask output layer based on the input convolution feature map and the first intermediate mask map. An up-sampling operation is performed on the first intermediate mask map F413 by the output up-sampling sublayer UP11, obtaining a mask map UF2. For example, the size of the first intermediate mask map F413 is 96×128, and the size of the mask map UF2 is 192×256. The number of feature channels of the first intermediate mask map F413 is 16, and the number of feature channels of the mask map UF2 is 16. The number of feature channels of the first intermediate mask map F413 is the same as the number of feature channels of the mask map UF2. The size of the mask map UF2 is four times of the size of the first intermediate mask map F413.

In some embodiments, the up-sampling operation of the process of constructing the first intermediate mask map using the first mask middle layer based on the first intermediate convolution feature map and the input mask map layer is different from the up-sampling operation of the process of constructing and outputting the target mask map of the input image using the mask output layer based on the input convolution feature map and the first intermediate mask map.

Referring to FIG. 3A, in some embodiments, the first output de-convolution sublayer DC11 receives the input convolution feature map F12 and the output (e.g. the mask map UF2) from the output up-sampling sublayer UP11. Optionally, the input convolution feature map F12 and the mask map UF2 are connected together (e.g., concatenated together). Optionally, a mask construction operation is performed on the combination of the input convolution feature map F12 and the mask map UF2, obtaining a mask map F31. Optionally, the number of the feature channels of the mask map F31 is a half of sum of the number of feature channels of the input convolution feature map F12 and the number of feature channels of the mask map UF2. For example, referring to FIG. 5, the number of feature channels of the input convolution feature map F12 is 12, the number of feature channels of the mask map UF2 is 16. The input convolution feature map F12, the mask map UF2 and the mask map F31 have a same size, e.g. 192×256.

Referring to FIG. 3A, in some embodiments, a mask construction operation is performed on the output (e.g. the mask map F31) from the first output de-convolution sublayer DC11 by the second output de-convolution sublayer DC12, obtaining a mask map F32. For example, referring to FIG. 5, the number of feature channels of the mask map F31 is 16, and the number of feature channels of the mask map F32 is 16. The mask map F32 and the mask map F31 have a same size, e.g. 192×256.

Referring to FIG. 3A, in some embodiments, a mask construction operation is performed on the output (e.g. the mask map F32) from second output de-convolution sublayer DC12 by the third output de-convolution sublayer DC13, obtaining the target mask map of the input image. For example, referring to FIG. 5, the number of feature channel of the mask map F32 is 8, and the number of feature channels of the target mask map of the input image is 1. The target mask map of the input image and the input image have a same size, e.g. 192×256.

In some embodiments, a binarization operation is performed on the target mask map of the input image, so a value of each pixel on the target mask map of the input image is 0 or 255. Optionally, the binarization operation performed on the target mask map includes activating the mask map outputted from the third output dc-convolution sublayer using an activation function, obtaining an activated mask map outputted from the third output de-convolution sublayer and ensuring that the value of each pixel of the mask map outputted from the third output de-convolution sublayer in a range of (0, 1); and binarizing the activated mask map outputted from the third output de-convolution sublayer. In one example, if the value of one of the pixels of the mask map outputted from the third output de-convolution sublayer is greater than 0.5, the value of the one of the pixels is reset as 1. In another example, if the value of one of the pixels of the mask map outputted from the third output de-convolution sublayer is less than 0.5, the value of the one of the pixels is reset as 0. Optionally, the binarization operation performed on the target mask map further includes converting the value of pixels of the activated mask map outputted from the third output de-convolution sublayer into 0 or 225, obtaining a binarized target mask map of the input image. In one example, if the value of one of the pixels of the mask map outputted from the third output de-convolution sublayer is 0, the value of the one of the pixels keeps 0. In another example, if the value of one of the pixels of the mask map outputted from the third output de-convolution sublayer is 1, the value of the one of the pixels is converted into 225.

In some embodiments, the mask construction network includes a plurality of first batch normalization sublayers. Optionally, the plurality of first batch normalization sublayers are used to perform standardization operation on a mask map, ensuring that the grayscales of pixels of the mask map are in a certain range, reducing the complexity of computation, and enhancing the contrast of the mask map. Optionally, the range of the grayscales of pixels of the mask map is [−1, 1].

In some embodiments, the number of the plurality of first batch normalization sublayers equals to the number of a plurality of the de-convolution sublayers in the mask construction network. Optionally, each individual one of the plurality of first batch normalization sublayers is disposed after a respective one of the de-convolution sublayers. Optionally, referring to FIG. 3B, in a first mask middles layer 21A, a sublayer B21 of the plurality of first batch normalization sublayers is disposed after the first intermediate de-convolution sublayer DC21. A sublayer B22 of the plurality of first batch normalization sublayers is disposed after the second intermediate de-convolution sublayer DC22. Optionally, the sublayer B21 of the plurality of first batch normalization sublayers may perform a normalized operation on the output from the first intermediate de-convolution sublayer DC21. The sublayer B22 of the plurality of first batch normalization sublayers may perform a normalized operation on the output from the second intermediate de-convolution sublayer DC22.

In one example, a mini-batch gradient decent method is adopted in the normalized operation of the plurality of first batch normalization sublayers. If the size of the mini-batch gradient decent method is T, the number of mask maps outputted from the first intermediate de-convolution sublayer DC21 is C, and each one of the mask maps includes a matrix having H rows and W columns, an equation of the mask maps is represented by (T, C, W, H). Therefore, the standardized equation of the plurality of first batch normalization sublayers is as follows:

$$y_{tijk} = \frac{x_{tijk} - \mu_{ti}}{\sqrt{\sigma_{ti}^2 + \varepsilon}}, \mu_{ti} = \frac{1}{HW}\sum_{l=1}^{W}\sum_{m=1}^{H} x_{tilm},$$

$$\sigma_{ti}^2 = \frac{1}{HW}\sum_{l=1}^{W}\sum_{m=1}^{H}(x_{tilm} - m\mu_{ti})^2;$$

wherein, $X_{tijk}$ is a value of a pixel in column j and row k of the number i mask maps of the number t patch of a collection of mask maps outputted from the first intermediate de-convolution sublayer DC21. $y_{tijk}$ represents the result obtained after $X_{tijk}$ is processed by one of the plurality of first batch normalization sublayers. $\varepsilon$ is a small integer ensuring that the denominator is not 0.

In some embodiments, the mask construction network includes a plurality of first activation sublayers. Optionally, each individual one of the plurality of first activation sublayers includes an activation equation. Optionally, the activation equation is used to introduce nonlinear factors into the mask construction network, allowing the mask construction network to easily solve complicated problems. Various appropriate equations may be used as active equations. The examples of appropriate equations used as active equations include, but not limited to, the linear correction unit function (ReLU), the sigmoid function or the hyperbolic tangent function (tanh function). Optionally, the linear correction unit function is an unsaturated nonlinear function including Leaky-ReLU function, P-ReLU function and R-ReLU function. Optionally, the sigmoid function and the tanh function are saturated nonlinear function.

In some embodiments, one of the plurality of first activation sublayers can be a sublayer of the mask construction network. Optionally, referring to FIG. 3B, in the first mask middle layer 21A, a sublayer A21 of the plurality of first activation sublayers is disposed after the sublayer B21 of the plurality of first batch normalization sublayers. A sublayer A22 of the plurality of first activation sublayers is disposed after the sublayer B22 of the plurality of first batch normalization sublayers. Optionally, the sublayer A21 of the plurality of first activation sublayers may perform an activation operation on the output from the sublayer B21 of the plurality of first batch normalization sublayers. The sublayer A22 of the plurality of first activation sublayers may perform an activation operation on the output from the sublayer B22 of the plurality of first batch normalization sublayers.

In some embodiments, in a normalized operation and an activation operation, in the first mask middle layer 21A, the sublayer A21 of the plurality of first activation sublayers receives the output from the sublayer B21 of the plurality of first batch normalization sublayers. In order to ensure that a mask map outputted from the first intermediate de-convolution sublayer DC21 is a sensitive range of the activation function of the sublayer A21 of the plurality of first activation sublayers, the sublayer B21 of the plurality of first batch normalization sublayers controls the calculation result of mini-batch gradient decent. And the result of mini-batch gradient decent should be that mean is 0, and the variance is 1. Therefore, the sublayer A21 of the plurality of first activation sublayers can work effectively, and the output from the sublayer A21 of the plurality of first activation sublayers can better represent the feature information of the first intermediate convolution feature map F212.

In some embodiments, the activation function can be included in a de-convolution layer. Optionally, the first intermediate de-convolution sublayer DC21 includes an activation function. Optionally, the second intermediate de-convolution sublayer DC22 includes an activation function. Optionally, the mask construction operation includes an active operation.

Figure 3B:
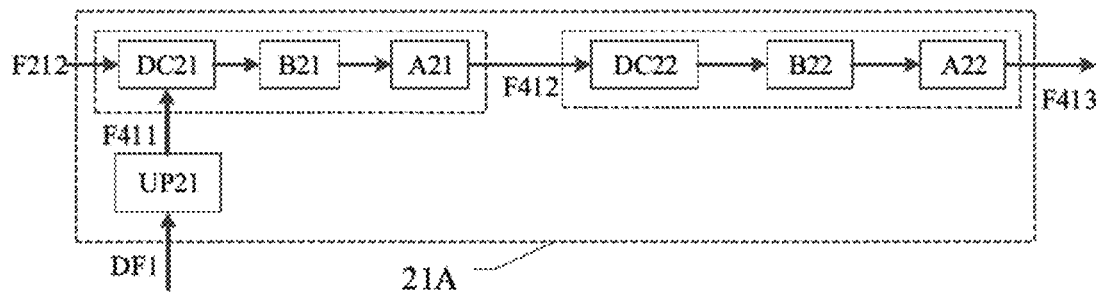
FIG. 3B is a schematic diagram of a structure of a first mask middle layer of a mask construction network in some embodiments according to the present disclosure.

In some embodiments, referring to both FIG. 3A and FIG. 3B, the mask output layer 20 and the mask input layer 22 can include one of the plurality of first batch normalization sublayers and one of the plurality of the activation sublayers. Optionally, functions and locations of one of the plurality of first batch normalization sublayers and one of the plurality of the activation sublayers in the mask output layer 20 is the same as functions and locations of one of the plurality of first batch normalization sublayers and one of the plurality of the activation sublayers in the mask intermediate layer 21. Optionally, functions and locations of one of the plurality of first batch normalization sublayers and one of the plurality of the activation sublayers in the mask input layer 22 is the same as functions and locations of one of the plurality of first batch normalization sublayers and one of the plurality of the activation sublayers in the mask intermediate layer 21.

Figure 7:
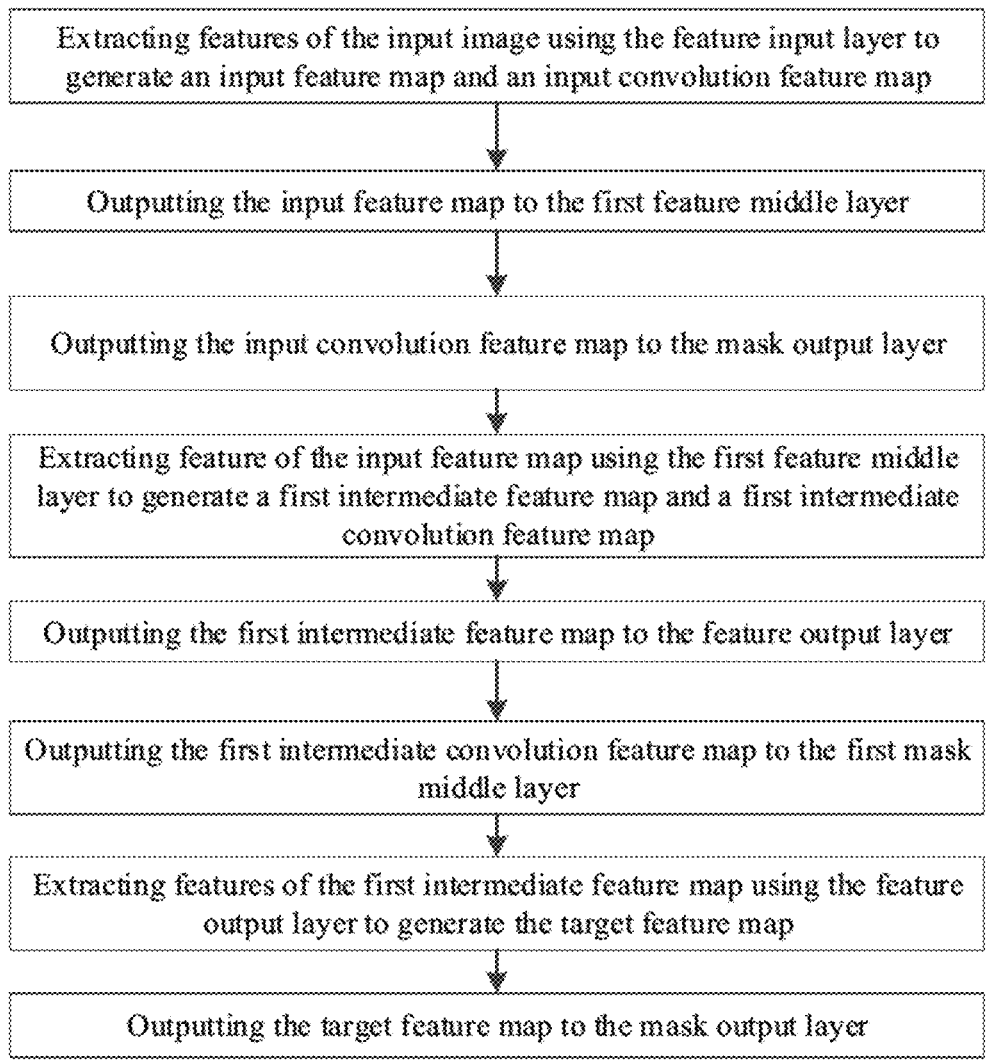
FIG. 7 is a flow chat illustrating an image processing method in some embodiments according to the present disclosure.

FIG. 7 is a flow chat illustrating an image processing method in some embodiments according to the present disclosure. Referring to FIG. 7, in some embodiments, an image processing method includes extracting features of the input image using the feature input layer to generate an input feature map and an input convolution feature map; outputting the input feature map to the first feature middle layer; outputting the input convolution feature map to the mask output layer; extracting feature of the input feature map using the first feature middle layer to generate a first intermediate feature map and a first intermediate convolution feature map; outputting the first intermediate feature map to the feature output layer, outputting the first intermediate convolution feature map to the first mask middle layer; extracting features of the first intermediate feature map using the feature output layer to generate the target feature map; outputting the target feature map to the mask output layer.

Referring to FIG. 3A, the feature input layer 10 includes a first input convolution sublayer C11, a second input convolution sublayer C12 and an input down-sampling sublayer P11. Optionally, the feature input layer 10 can perform a first feature extraction operation, a second feature extraction operation, and a down-sampling operation on an input image. In some embodiments, referring to FIG. 3A and FIG. 7, extracting features of the input image using the feature input layer 10 to generate an input feature map and an input convolution feature map includes performing a first feature extraction operation on the input image using the first input convolution sublayer C11; performing a second feature extraction operation on an output (e.g. a feature map F11) from the first input convolution sublayer C11 using the second input convolution sublayer C12, generating and outputting an input convolution feature map F12 to the mask output layer 20; and performing a down-sampling operation on the input convolution feature map F12 using the input down-sampling sublayer P11, generating an input feature map F13. Optionally, the input feature map F13 is outputted to the first feature middle layer 11A.

In some embodiments, the first feature extraction operation includes a convolution operation and a channel addition operation. In one example, referring to FIG. 5, the input image is a color image having Red color channel, Green color channel, and Blue color channel. The first input convolution sublayer C11 performs a convolution operation and a channel addition operation on the input image, obtaining a feature map F11. The feature channels of feature map F11 is 16. In another example, referring to FIG. 3A, the first input convolution sublayer C11 includes 16 convolution kernels generating and outputting 16 sub-feature maps. The feature map F11 includes the 16 sub-feature maps.

In some embodiments, the second feature extraction operation includes a convolution operation. Optionally, a convolution operation is performed on the output (e.g. the feature map F11) from the first input convolution sublayer C11 using the second input convolution sublayer C12, obtaining an input convolution feature map F12. Optionally, the number of feature channels of the input convolution feature map F12 is 16.

In some embodiments, in the first feature extraction operation, a convolution kernel of the de-convolution operation is a 3×3 matrix. Optionally, the stride of the convolution kernel is 1, and the padding of the convolution kernel is 1. Subsequent to performing the first feature extraction operation on the input image using the first input convolution sublayer C11, the size of the feature map F11 outputted from the first input convolution sublayer C11 is the same as the size of the input image. For example, if the size of the input image is 192×256, the size of the feature map F11 outputted from the first input convolution sublayer C11 is also 192×256.

Figure 8:
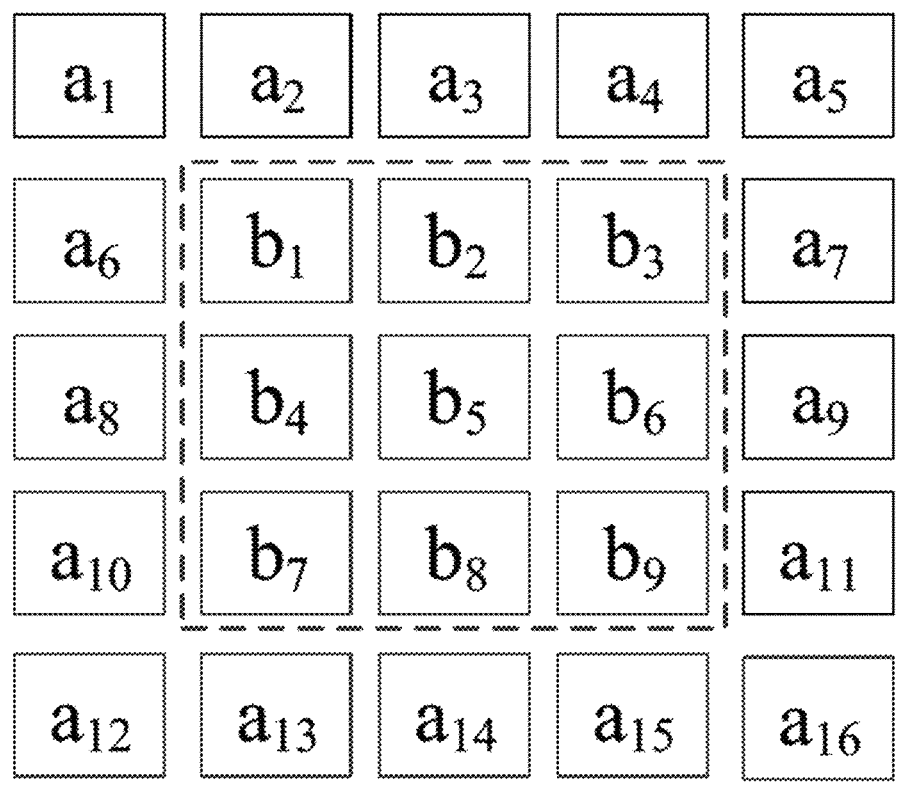

FIG. 8 is a schematic diagram illustrating a padding operation in some embodiments according to the present disclosure. Referring to FIG. 8, in some embodiments, in the first feature extraction operation, the size of the input image is 3×3. The input image includes 9 pixels (e.g. pixels from b1 to b9 in FIG. 8). Subsequent to performing a padding operation on the input image, the size of the input image becomes 5×5, and 16 pixels (e.g. pixels from a1 to a16 in FIG. 8) are added to the input image. During the padding operation, the data padded in the added pixels can be 1, 0 or any random number. For example, a value of each pixel from a1 to a16 is a value selected from a group consisting of 1, 0, and a random number. Optionally, the data padded in each added pixels can be the value of a respective pixel directly abutting to the added pixel. For example, the data padded in the pixel a2 and the pixel a6 is the value of the pixel b1. The data padded in the pixel a1 is the value of the pixel b1. The data padded in the pixel a5 is the value of the pixel b3. The data padded in the pixel a12 is the value of the pixel b7. The data padded in the pixel a16 is the value of the pixel b9.

In some embodiments, in the second feature extraction operation, a convolution kernel of the de-convolution operation is a 3×3 matrix. Optionally, the stride of the convolution kernel is 1, and the padding of the convolution kernel is 1. The size of the input convolution feature map F12 outputted from the second input convolution sublayer C12 is the same as the size of the feature image F11 outputted from the first input convolution sublayer C11, e.g. the size of the input convolution feature map F12 is 192×256, which is the same as the size of the input image 192×256.

In some embodiments, referring to FIG. 3A, the input down-sampling sublayer P11 is used to reduce the dimensions of the input image, reducing the amount of data, simplifying the computational complexity, and reducing the over-fitting phenomenon. Optionally, the input down-sampling sublayer P11 can perform feature compression and extract main features of the input image. The input down-sampling sublayer P11 can reduce the size of the input convolution feature map F12 outputted from the second input convolution sublayer C12, at the same time, the input down-sampling sublayer P11 can keep the number of feature channels of the input convolution feature map F12. In one example, referring to both FIG. 3A and FIG. 5, a down-sampling operation is performed on the input convolution feature map F12 by the input down-sampling sublayer P11, obtaining an input feature map F13. The number of feature channels of the input feature map F13 is 16. If the down-sampling factor of the down-sampling operation is a 2×2 matrix, and the stride of the 2×2 matrix is 2, the size of the input feature map F13 is 96×128.

Various appropriate methods of down-sampling may be used to perform the down-sampling operation. Examples of the methods of down-sampling used to perform the down-sampling operation include, but not limited to, max pooling, average pooling, random pooling, decimation, demuxout. Optionally, the decimation includes choosing certain pixels. Optionally, the demuxout includes segmenting the input image into multiple smaller images.

In some embodiments, the input down-sampling sublayer P11 includes a pooling layer. The down-sampling operation can be a pooling operation. Optionally, the input down-sampling sublayer P11 corresponds to the output up-sampling sublayer UP11. For example, parameters of a pooling operation can be transmitted to the output up-sampling sublayer UP11 by the input down-sampling sublayer P11. The parameters of a pooling operation optionally include the coordinate of a pixel having a maximum value in the input convolution feature map F12.

Referring to FIG. 3A, in some embodiments, the first feature middle layer 11A includes a first intermediate convolution sublayer C21, a second intermediate convolution sublayer C22, and an intermediate down-sampling sublayer P21 sequentially connected together. Optionally, the first feature middle layer 11A can perform a first feature extraction operation, a second feature extraction operation, and a down-sampling operation on the input feature map F13. Referring to both FIG. 3A and FIG. 7, extracting feature of the input feature map using the first feature middle layer to generate a first intermediate feature map and a first intermediate convolution feature map includes performing a first feature extraction operation on the input feature map F13 using the first intermediate convolution sublayer C21 of the first feature middle layer 11A; performing a second feature extraction operation on the output from the first intermediate convolution sublayer C21 using the second intermediate convolution sublayer C22 of the first feature middle layer 11A, generating and outputting a first intermediate convolution feature map F212; and performing a down-sampling operation on the first intermediate convolution feature map F212 using the intermediate down-sampling sublayer P21 of the first feature middle layer 11A, generating a first intermediate feature map F213. Optionally, the first intermediate feature map F213 is outputting to the feature output layer 12.

Referring to FIG. 3A and FIG. 5, the first feature extraction operation can be performed on the input feature map F13 by the first intermediate convolution sublayer C21 of the first feature middle layer 11A to obtain a feature map F21. Optionally, the number of feature channels of the feature map F211 is 32, e.g., twice the number of feature channels of the input feature map P13. The size of the feature map F211 is 96×128, same as the size of the input feature map F13.

In some embodiments, referring to FIG. 5, a second feature extraction operation is performed on the feature map F211 by the second intermediate convolution sublayer C22 of the first feature middle layer 11A, generating a first intermediate convolution feature map F212. Optionally, the number of feature channels of the first intermediate convolution feature map F212 is 32. The size of the first intermediate convolution feature map F212 is 96×128. The first intermediate convolution feature map F212 and the input feature map F13 have a same size.

In some embodiments, referring to FIG. 3A and FIG. 5, a down-sampling operation is performed on the first intermediate convolution feature map F212 by the intermediate down-sampling sublayer P21 of the first feature middle layer 11A to generate a first intermediate feature map F213. Optionally, the number of feature channels of the first intermediate feature map F213 is 32. The size of the first intermediate feature map F213 is 48×64.

In some embodiments, the intermediate down-sampling sublayer P21 of the first feature middle layer 11A is a pooling layer, and the intermediate down-sampling sublayer P21 of the first feature middle layer 11A corresponds to the intermediate up-sampling sublayer UP21 of the first mask middle layer 21A. For example, parameters of a pooling operation can be transmitted from the intermediate down-sampling sublayer P21 of the first feature middle layer 11A to the intermediate up-sampling sublayer UP21 of the first mask middle layer 21A.

In some embodiments, referring to FIG. 3A, the feature output layer 12 includes an output convolution sublayer C31. Referring to both FIG. 3A and FIG. 7, extracting features of the first intermediate feature map using the feature output layer to generate the target feature map includes performing a first feature extraction operation on the first intermediate feature map F213 using the output convolution sublayer C31, generating a target feature map TF. Optionally, the target feature map TF is outputted to the mask input layer 22.

In some embodiments, the first intermediate feature map F213 and the target feature map TF have a same size. Referring to FIG. 5, the size of the target feature map TF is 48×64, and the number of feature channels of the target feature map TF is 32.

Figure 3C:
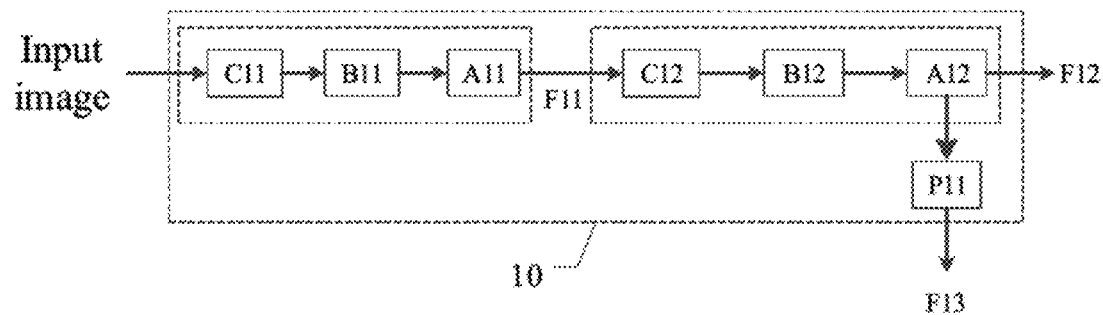
FIG. 3C is a schematic diagram of a structure of a feature input layer of a feature extraction network in some embodiments according to the present disclosure.

In some embodiments, the feature extraction network includes a plurality of second batch normalization sublayers. Optionally, the number of the plurality of second batch normalization sublayers equals to the number of a plurality of the convolution sublayers in the feature extraction network. Optionally, each individual one of the plurality of second batch normalization sublayers is disposed after a respective one of the convolution sublayers. Optionally, referring to FIG. 3C, in the feature input layer 10, a sublayer B11 of the plurality of second batch normalization sublayers is disposed after the first input convolution sublayer C11. Optionally, a sublayer B12 of the plurality of second batch normalization sublayers is disposed after second input convolution sublayer C12. Optionally, the sublayer Bit 1 of the plurality of second batch normalization sublayers may perform a normalized operation on the output from first input convolution sublayer C11. Optionally, the sublayer B12 of the plurality of second batch normalization sublayers may perform a normalized operation on the output from second input convolution sublayer C12.

In some embodiments, the convolution sublayers include the first input convolution sublayer C1, the second input convolution sublayer C12, the first intermediate convolution sublayer C21, the second intermediate convolution sublayer C22, and the output convolution sublayer C31.

In some embodiments, the plurality of second batch normalization sublayers are structurally and functionally the same as the plurality of first batch normalization sublayers. The plurality of second batch normalization sublayers can be constructed in a fashion similar to the plurality of first batch normalization sublayers.

In some embodiments, the feature extraction network includes a plurality of second activation sublayers. Optionally, the plurality of second activation sublayers are used to introduce nonlinear factors into the feature extraction network, allowing the feature extraction network to easily solve complicated problems.

In some embodiments, the plurality of second activation sublayers are structurally and functionally the same as the plurality of first activation sublayers. The plurality of second activation sublayers can be constructed in a fashion similar to the plurality of first activation sublayers.

In some embodiments, one of the plurality of second activation sublayers can be a sublayer of the feature extraction network. Optionally, referring to FIG. 3C, in the feature input layer 10, a sublayer A11 of the plurality of second activation sublayers is disposed after the sublayer B11 of the plurality of second batch normalization sublayers. A sublayer A12 of the plurality of second activation sublayers is disposed after the sublayer B12 of the plurality of second batch normalization sublayers. Optionally, the sublayer A11 of the plurality of second activation sublayers may perform an activation operation on the output from the sublayer B11 of the plurality of second batch normalization sublayers. The sublayer A12 of the plurality of second activation sublayers may perform an activation operation on the output from the sublayer B12 of the plurality of second batch normalization sublayers.

In some embodiments, an activation function can be included in a convolution layer. Optionally, the first input convolution sublayer C11 includes an activation function. Optionally, the second input convolution sublayer C12 includes an activation function. Optionally, the first feature extraction operation includes an activation operation. Optionally, the second feature extraction operation includes an activation operation.

In some embodiments, the plurality of second batch normalization sublayers are structurally different from the plurality of first batch normalization sublayers. The plurality of second activation sublayers are structurally different from the plurality of first activation sublayers.

In some embodiments, the mask intermediate layer includes one or a plurality of mask middle layers sequentially connected together. The feature intermediate layer includes one or a plurality of feature middle layers sequentially connected together. Optionally, two corresponding middle layers having a same feature size and respectively from the one or the plurality of feature middle layers and the one or the plurality of mask middle layers are connected to each other. For example, an intermediate up-sampling sublayer of the one or the plurality of mask middle layers corresponds to an intermediate down-sampling sublayer of the one of the plurality of feature middle layers.

In some embodiments, each the one or the plurality of feature middle layers includes a first intermediate convolution sublayer, a second intermediate convolution sublayer and an intermediate down-sampling sublayer. In some embodiments, each the one or the plurality of mask middle layers includes an intermediate up-sampling sublayer, a first intermediate de-convolution sublayer, and a second intermediate de-convolution sublayer. For example, referring to FIG. 3A, a structure of each of the one or the plurality of feature middle layers is the same as the structure of the first feature middle layer 11A. In another example, a structure of each of the one or the plurality of mask middle layers is the same as the structure of the first mask middle layer 21A.

Figure 9:
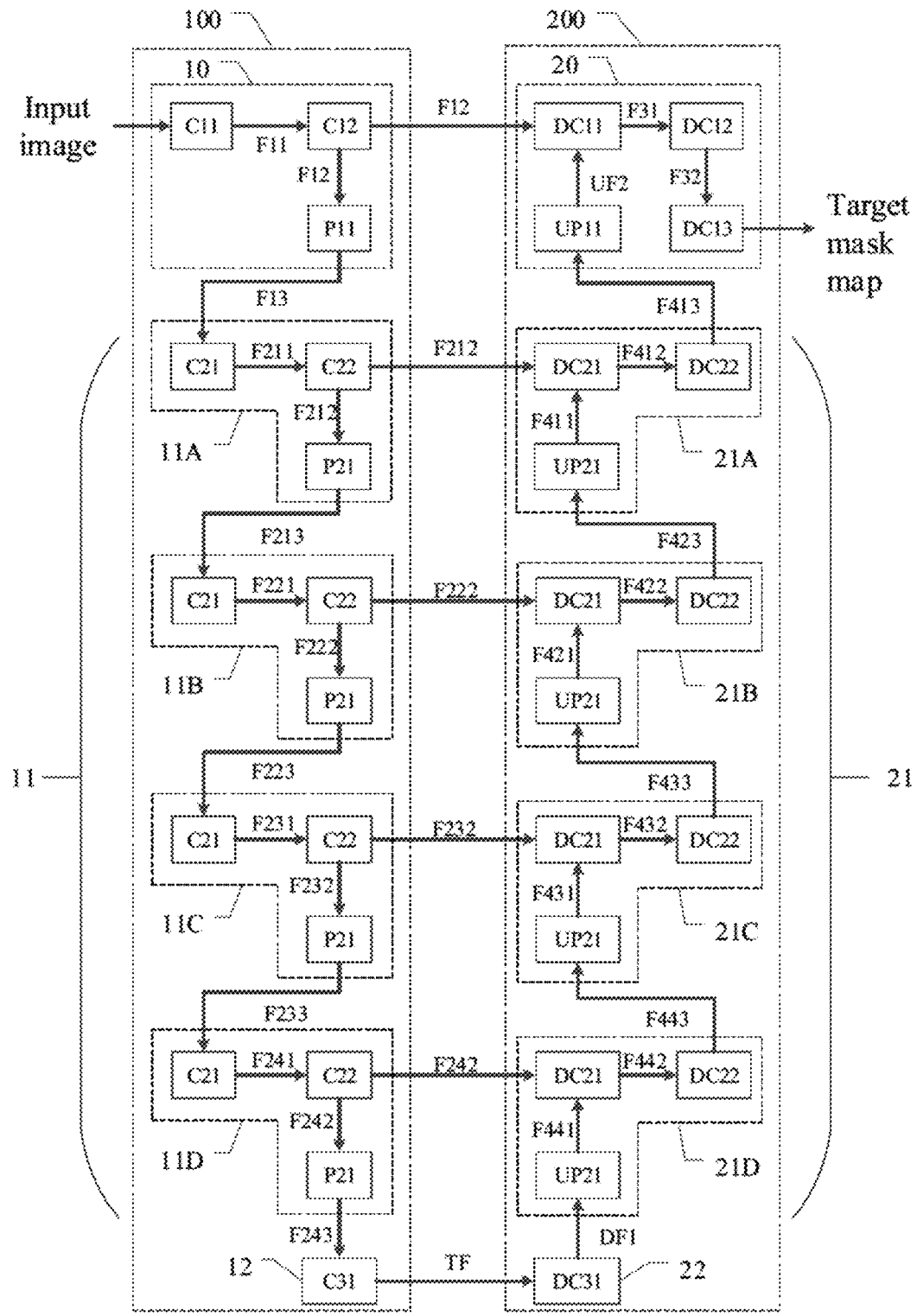
FIG. 9 is a schematic diagram of structures of a feature extraction network and a mask construction network in some embodiments according to the present disclosure.

FIG. 9 is a schematic diagram of structures of a feature extraction network and a mask construction network in some embodiments according to the present disclosure. Referring to FIG. 9, in some embodiments, the mask intermediate layer 21 further includes a second mask middle layer 21B, a third mask middle layer 21C, and a fourth mask middle layer 21D. Optionally, the first mask middle layer 21A, the second mask middle layer 21B, the third mask middle layer 21C, and the fourth mask middle layer 21D are sequentially connected together. In some embodiments, the feature intermediate layer 11 further includes a second feature middle layer 11B, a third feature middle layer 11C, and a fourth feature middle layer 11D. Optionally, the first feature middle layer 11A, the second feature middle layer 11B, the third feature middle layer 11C and the fourth feature middle layer 11D are sequentially connected together. Optionally, the first mask middle layer 21A corresponds to the first feature middle layer 11A. The second mask middle layer 21B corresponds to the second feature middle layer 11B. The third mask middle layer 21C corresponds to the third feature middle layer 11C. The fourth mask middle layer 21D corresponds to the fourth feature middle layer 11D.

In some embodiments, features of the input feature map F13 are extracted using the first feature middle layer 11A to generate a first intermediate feature map F213 and a first intermediate convolution feature map F212. Optionally, the first intermediate feature map F213 is outputted to the second feature middle layer 11B. Optionally, the first intermediate convolution feature map F212 is outputted to the first mask middle layer 21A.

In some embodiments, features of the first intermediate feature map F213 are extracted using the second feature middle layer 11B to generate a second intermediate feature map F223 and a second intermediate convolution feature map F222. Optionally, the second intermediate feature map F223 is outputted to the third feature middle layer 11C. Optionally, the second intermediate convolution feature map F222 is outputted to the second mask middle layer 21B.

In some embodiments, features of the second intermediate feature map F223 are extracted using the third feature middle layer 11C to generate a third intermediate feature map F233 and a third intermediate convolution feature map F232. Optionally, the third intermediate feature map F233 is outputted to the fourth feature middle layer 11D. Optionally, the third intermediate convolution feature map F232 is outputted to the third mask middle layer 21C.

In some embodiments, features of the third intermediate feature map F233 are extracted using the fourth feature middle layer 11D to generate a fourth intermediate feature map F243 and a fourth intermediate convolution feature map F242. Optionally, the fourth intermediate feature map F243 is outputted to the feature output layer 12. Optionally, the fourth intermediate convolution feature map F242 is outputted to the fourth mask middle layer 21D.

In some embodiments, a first feature extraction operation is performed on the input feature map F13 by the first intermediate convolution sublayer C21 of the first feature middle layer 11A to obtain a feature map F211. Optionally, a second feature extraction operation is performed on the feature map F211 by the second intermediate convolution sublayer C22 of the first feature middle layer 11A to obtain a first intermediate convolution feature map F212. Optionally, a down-sampling operation is performed on the first intermediate convolution feature map F212 by the intermediate down-sampling sublayer P21 of the first feature middle layer 11A to obtain a first intermediate feature map F213.

In some embodiments, a first feature extraction operation is performed on the first intermediate feature map F213 by the first intermediate convolution sublayer C21 of the second feature middle layer 11B to obtain a feature map F221. Optionally, a second feature extraction operation is performed on the feature map F221 by the second intermediate convolution sublayer C22 of the second feature middle layer 11B to obtain a second intermediate convolution feature map F222. Optionally, a down-sampling operation is performed on the second intermediate convolution feature map F222 by the intermediate down-sampling sublayer P21 of the second feature middle layer 11B to obtain a second intermediate feature map F223.

In some embodiments, a first feature extraction operation is performed on the second intermediate feature map F223 by the first intermediate convolution sublayer C21 of the third feature middle layer 11C to obtain a feature map F231. Optionally, a second feature extraction operation is performed on the feature map F231 by the second intermediate convolution sublayer C22 of the third feature middle layer 11C to obtain a third intermediate convolution feature map F232. Optionally, a down-sampling operation is performed on the third intermediate convolution feature map F232 by the intermediate down-sampling sublayer P21 of the third feature middle layer 11C to obtain a third intermediate feature map F233.

In some embodiments, a first feature extraction operation is performed on the third intermediate feature map F233 by the first intermediate convolution sublayer C21 of the fourth feature middle layer 11D to obtain a feature map F241. Optionally, a second feature extraction operation is performed on the feature map F241 by the second intermediate convolution sublayer C22 of the fourth feature middle layer 11D to obtain a fourth intermediate convolution feature map F242. Optionally, a down-sampling operation is performed on the fourth intermediate convolution feature map F242 by the intermediate down-sampling sublayer P21 of the fourth feature middle layer 11D to obtain a fourth intermediate feature map F243.

In some embodiments, an up-sampling operation is performed on the input mask map DF1 by the intermediate up-sampling sublayer UP21 of the fourth mask middle layer 21D to obtain a mask map F441. Optionally, a mask construction operation is performed on a combination of the fourth intermediate convolution feature map F242 outputted by the fourth feature middle layer 11D and the mask map F441 by the first intermediate de-convolution sublayer DC21 of the fourth mask middle layer 21D to obtain a mask map F442. Optionally, a mask construction operation is performed on the mask map F442 by the second intermediate de-convolution sublayer DC22 of the fourth mask middle layer 21D to generate and output a fourth intermediate mask map F443 to the third mask middle layer 21C.

In some embodiments, an up-sampling operation is performed on the fourth intermediate mask map F443 by the intermediate up-sampling sublayer UP21 of the third mask middle layer 21C to obtain a mask map F431. Optionally, a mask construction operation is performed on a combination of the third intermediate convolution feature map F232 outputted by the third feature middle layer 11C and the mask map F431 by the first intermediate de-convolution sublayer DC21 of the third mask middle layer 21C to obtain a mask map F432. Optionally, a mask construction operation is performed on the mask map F432 by the second intermediate de-convolution sublayer DC22 of the third mask middle layer 21C to generate and output a third intermediate mask map F433 to the second mask middle layer 21B.

In some embodiments, an up-sampling operation is performed on the third intermediate mask map F433 by the intermediate up-sampling sublayer UP21 of the second mask middle layer 21B to obtain a mask map F421. Optionally, a mask construction operation is performed on a combination of the second intermediate convolution feature map F222 outputted by the second feature middle layer 11B and the mask map F421 by the first intermediate de-convolution sublayer DC21 of the second mask middle layer 21B to obtain a mask map F422. Optionally, a mask construction operation is performed on the mask map F422 by the second intermediate de-convolution sublayer DC22 of the second mask middle layer 21B to generate and output a second intermediate mask map F423 to the first mask middle layer 21A.

In some embodiments, an up-sampling operation is performed on the second intermediate mask map F423 by the intermediate up-sampling sublayer UP21 of the first mask middle layer 21A to obtain a mask map F411. Optionally, a mask construction operation is performed on a combination of the first intermediate convolution feature map F212 outputted by the first feature middle layer 11A and the mask map F411 by the first intermediate de-convolution sublayer DC21 of the first mask middle layer 21A to obtain a mask map F412. Optionally, a mask construction operation is performed on the mask map F412 by the second intermediate de-convolution sublayer DC22 of the first mask middle layer 21A to generate and output a first intermediate mask map F413 to the mask output layer 20.

In some embodiments, in the feature intermediate layer 11, one or each of the plurality of feature middle layers performs a first feature extraction operation, a second feature extraction operation, and a down-sampling operation. Optionally, during a first feature extraction operation, the numbers of the feature channels of a feature map are increased, while the size of the feature map remains the same. Optionally, during a second feature extraction operation, the numbers of the feature channels of a feature map and the size of the feature map remain the same. Optionally, during a down-sampling operation, the numbers of the feature channels of a feature map remain the same, while the size of the feature map is decreased.

Figure 10:
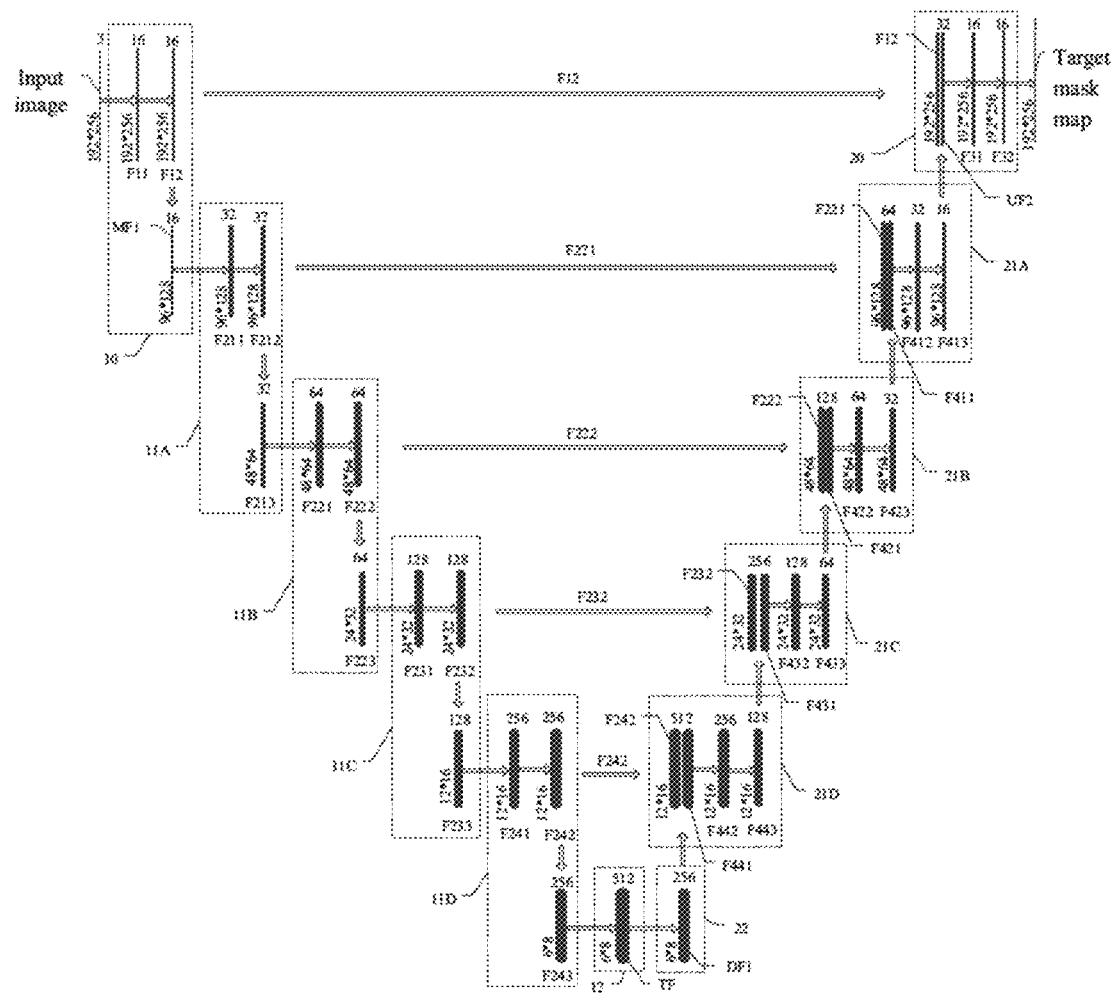
FIG. 10 is a schematic diagram illustrating a change of feature channels in some embodiments according to the present disclosure.

FIG. 10 is a schematic diagram illustrating a change of feature channels in some embodiments according to the present disclosure. Referring to FIG. 3A and FIG. 10, in some embodiments, in first feature middle layer 11A, the first intermediate convolution sublayer C21 of the first feature middle layer 11A outputs the feature map F211. The second intermediate convolution sublayer C22 of the first feature middle layer 11A outputs first intermediate convolution feature map F212. The intermediate down-sampling sublayer P21 of the first feature middle layer 11A outputs the first intermediate feature map F213. Optionally, the size of the feature map F211 and the size of the first intermediate convolution feature map F212 are both 96×128. The size of the first intermediate feature map F213 is 48×64. The number of feature channels of the feature map F211, the number of feature channels of the first intermediate convolution feature map F212, and the number of feature channels of the first intermediate feature map F213 are 32.

In some embodiments, in the mask intermediate layer 21, the one or each of the plurality of mask middle layers can perform one up-sampling operation and two mask construction operations. Optionally, in a mask construction operation, the numbers of feature channels of a feature map are decreased, while the size of the feature map remains the same. In an up-sampling operation, the numbers of feature channels of a feature map remain the same, while the size of the feature map is decreased.

In some embodiments, in the first mask middle layer 21A, the intermediate up-sampling sublayer UP21 of the first mask middle layer 21A outputs the mask map F411. The first intermediate de-convolution sublayer DC21 of the first mask middle layer 21A outputs the mask map F412. The second intermediate de-convolution sublayer DC22 of the first mask middle layer 21A outputs the first intermediate mask map F413. Optionally, the size of the mask map F411, the size of the mask map F412, and the size of the first intermediate mask map F413 are 96×128. Optionally, the number of feature channels of the mask map F411 is 32. Optionally, the number of feature channels of the mask map F412 is 32. Optionally, the number of feature channels of the first intermediate mask map F413 is 16.

In some embodiments, prior to obtaining an input image, the image processing method also includes a training step. Optionally, the training step includes training the feature extraction network and the mask construction network using reference images and reference mask maps corresponding to the reference images to generate parameters for the feature extraction network and the mask construction network.

Figure 11A:
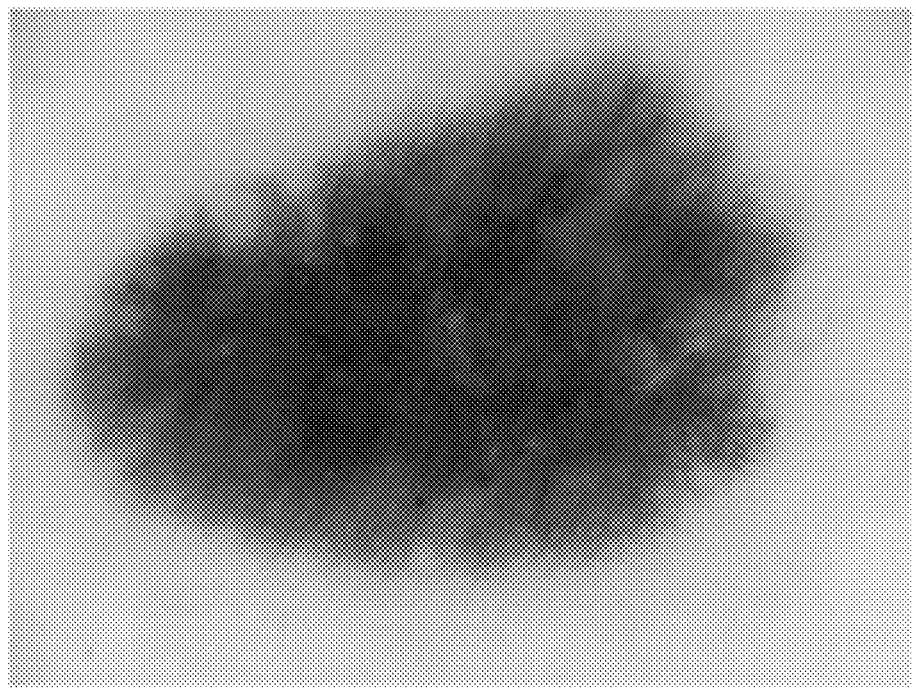
FIG. 11A is a schematic diagram of a reference image in some embodiments according to the present disclosure.
Figure 11B:
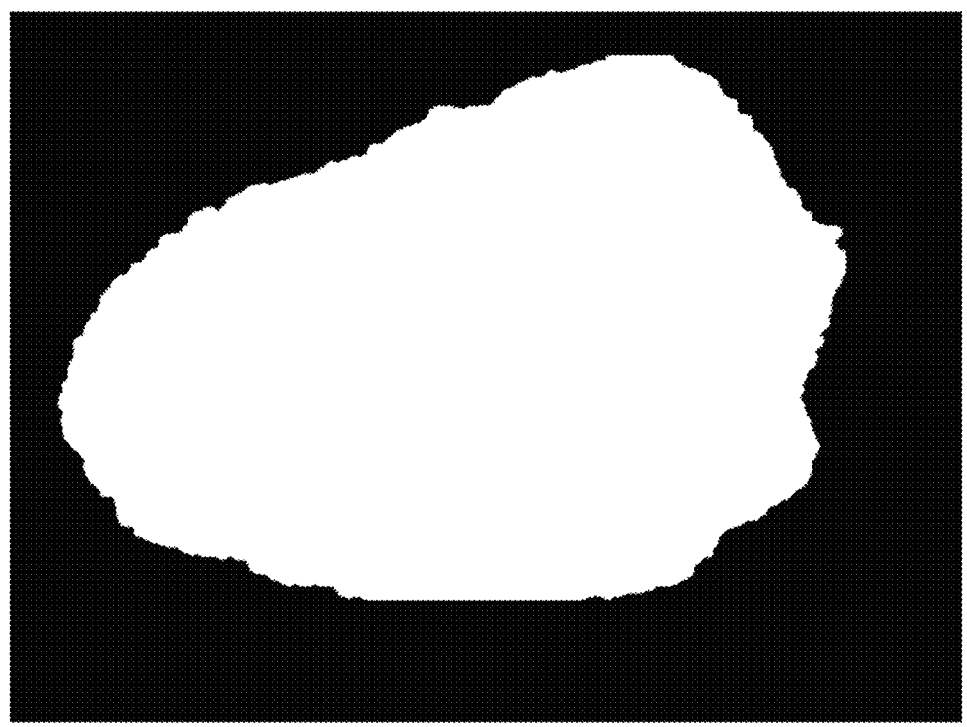
FIG. 11B is a schematic diagram of a reference mask map of a reference image in some embodiments according to the present disclosure.

FIG. 11A is a schematic diagram of a reference image in some embodiments according to the present disclosure. FIG. 11B is a schematic diagram of a reference mask map of a reference image in some embodiments according to the present disclosure. Referring to both FIG. 11A and FIG. 11B, the reference mask maps can represent standard segmentation maps of the reference images. For example, the reference mask maps are ground truth of the reference images. FIG. 11A is a reference image. FIG. 11B is a reference mask map of the reference image of FIG. 11A. Optionally, reference mask maps can be binarized images.

In some embodiments, the training step includes extracting features of a reference image using the feature extraction network to generate and output a training target feature map of the reference image; constructing and outputting a training mask map of the reference image using the mask construction network based on the training target feature map of the reference image; determining whether a loss function of the feature extraction network and the mask construction network satisfy a certain condition. Optionally, the loss function of the feature extraction network and the mask construction network satisfies a certain condition, the training step further includes obtaining a trained feature extraction network and a trained mask construction network. Optionally, the loss function of the feature extraction network and the mask construction network doesn't satisfy a certain condition, the training step further includes inputting another reference image and repeat the training step starting from extracting features of a reference image using the feature extraction network to generate and output a reference target feature map of the reference image.

In some embodiments, the initial parameters of the feature extraction network and the mask construction network can be set as random numbers. Optionally, the initial parameters of the feature extraction network and the mask construction network can be parameters of a trained feature extraction network and a trained mask construction network. Optionally, the trained feature extraction network and the trained mask construction network are trained by image databases such as ImageNet.

In some embodiments, the input image is a medical image, the reference images are various appropriate medical images from medical image databases. Parameters of different feature extraction networks and different mask construction networks can be trained based on different kinds of medical images.

Various appropriate medical images from medical image databases may be used as reference images. Example of appropriate medical images used as reference images include, but not limited to, brain tissue magnetic resonance images, blood vessel images, and lung CT images. Optionally, example of appropriate medical images used as reference images include, but not limited to, medical images showing healthy conditions, and medical images showing diseased conditions. Optionally, example of appropriate medical images used as reference images include, but not limited to, medical images of people having different ages, medical image of people from different regions. Various reference images may improve the accuracy of the image segmentation of the feature extraction network and the mask construction network.

In some embodiments, the certain condition corresponds to the minimum values of the loss function of the feature extraction network and the mask construction network using a reference image. Optionally, the certain condition may be a fixed amount of times for the training step or a fixed period of the training step performed by the feature extraction network and the mask construction network.

In some embodiments, a loss function represents a difference between the training mask maps and the reference mask map. Optionally, a loss function includes one or a combination of a Dyce similarity coefficient function and an intersection ratio function.

In one example, the Dyce similarity coefficient function can be represented as follows:

$$Loss1 = \begin{cases} 1 - 2 * \dfrac{\text{sum}(X1 \cap Y1)}{\text{sum}(X1) + \text{sum}(Y1)} & , |X1 \cup Y1| > 0 \\ 0 & , \text{others} \end{cases}$$

Wherein, Loss1 is the Dyce similarity coefficient function. X1 is a training mask map. Y1 is a reference mask map. Both the training mask map and the reference mask map are normalized matrixes.

In another example, the intersection ratio function can be represented as follows:

$$Loss2 = \begin{cases} 1 - \dfrac{\text{sum}(X2 \cap Y2)}{\text{sum}(X2) + \text{sum}(Y2) - \text{sum}(X2 \cap Y2)} & , |X2 \cup Y2| > 0 \\ 0 & , \text{others} \end{cases}$$

Wherein, Loss2 is the intersection ratio function. X2 is a training mask map. Y2 is a reference mask map. Both the training mask map and the reference mask map are normalized matrixes.

Referring to Loss1 and Loss2, the greater the values of Loss1 and Loss2 are (e.g. close to 1), the greater the difference between the training mask maps and the reference mask map is. Optionally, the greater the values of Loss1 and Loss2 are (e.g. close to 1), the greater the correction values of the parameters of the feature extraction network and the mask construction network are. Optionally, the smaller the values of Loss1 and Loss2 are (e.g. close to 1), the smaller the difference between the training mask maps and the reference mask map is.

Figure 12:
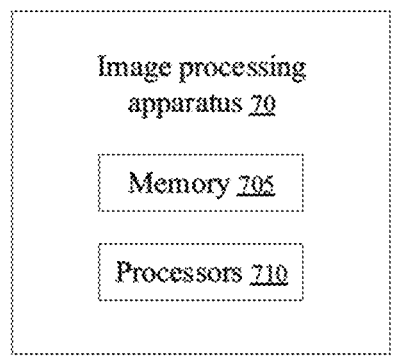
FIG. 12 is a schematic diagram of an image processing apparatus in some embodiments according to the present disclosure.

In another aspect, the present disclosure provides an image processing apparatus. FIG. 12 is a schematic diagram of an image processing apparatus in some embodiments according to the present disclosure. Referring to FIG. 12, an image processing apparatus 70 includes a memory 705 and one or more processors 710. Optionally, the memory 705 and the one or more processors 710 are connected with each other. Optionally, the memory 705 stores computer-executable instructions for controlling the one or more processors 710 to extract features of an input image using a feature extraction network to generate and output a target feature map of the input image; and construct and output a target mask map of the input image using a mask construction network based on the target feature map. Optionally, the feature extraction network includes a feature input layer, a feature intermediate layer, and a feature output layer sequentially connected together. Optionally, the mask construction network includes a mask input layer, a mask intermediate layer, and a mask output layer sequentially connected together. Optionally, the feature output layer is connected to the mask input layer. Optionally, the feature intermediate layer is connected to the mask intermediate layer. Optionally, the feature input layer is connected to the mask output layer. Optionally, the mask intermediate layer includes an intermediate up-sampling sublayer. Optionally, the mask output layer includes an output up-sampling sublayer. Optionally, each of the intermediate up-sampling sublayer and the output up-sampling sublayer includes an un-pooling layer.

Optionally, the feature intermediate layer includes one or a plurality of feature middle layers sequentially connected together, and the mask intermediate layer includes one or a plurality of mask middle layers sequentially connected together. Optionally, each of the one or the plurality of feature middle layers includes one or a plurality of intermediate convolution sublayers and one or a plurality of intermediate down-sampling sublayers sequentially connected together. Optionally, each of the one or the plurality of mask middle layers includes one or a plurality of intermediate de-convolution sublayers and one or a plurality of intermediate up-sampling sublayers sequentially connected together. Optionally, two corresponding middle layers having a same feature size and respectively from the one or the plurality of feature middle layers and the one or the plurality of mask middle layers are connected to each other.

Optionally, the feature intermediate layer includes a first feature middle layer; the mask intermediate layer includes a first mask middle layer, and the first feature middle layer is connected to the first mask middle layer.

In some embodiments, the memory 705 stores computer-executable instructions for controlling the one or more processors 710 to extract features of the input image using the feature input layer to generate an input feature map and an input convolution feature map; output the input feature map to the first feature middle layer; and output the input convolution feature map to the mask output layer; extract feature of the input feature map using the first feature middle layer to generate a first intermediate feature map and a first intermediate convolution feature map; output the first intermediate feature map to the feature output layer; output the first intermediate convolution feature map to the first mask middle layer, extract features of the first intermediate feature map using the feature output layer to generate the target feature map; and output the target feature map to the mask input layer.

Optionally, the mask input layer includes an input de-convolution sublayer.

In some embodiments, the memory 705 stores computer-executable instructions for controlling the one or more processors 710 to perform a mask construction operation on the target feature map using the input de-convolution sublayer to generate an input mask map, the mask construction operation including a de-convolution operation and a channel reduction operation; and output the input mask map to the first mask middle layer.

In some embodiments, the memory 705 stores computer-executable instructions for controlling the one or more processors 710 to construct a first intermediate mask map using the first mask middle layer based on the first intermediate convolution feature map and the input mask map; and output the first intermediate mask map to the mask output layer.

Optionally, the first mask middle layer includes a first intermediate de-convolution sublayer, a second intermediate de-convolution sublayer, and the intermediate up-sampling sublayer.

In some embodiments, the memory 705 stores computer-executable instructions for controlling the one or more processors 710 to perform an up-sampling operation on the input mask map using the intermediate up-sampling sublayer; perform a mask construction operation on the first intermediate convolution feature map using the first intermediate de-convolution sublayer, perform a mask construction operation on an output from the intermediate up-sampling sublayer using the first intermediate de-convolution sublayer; perform a mask construction operation on an output from the first intermediate de-convolution sublayer using the second intermediate de-convolution sublayer to generate the first intermediate mask map.

In some embodiments, the memory 705 stores computer-executable instructions for controlling the one or more processors 710 to construct and output the target mask map of the input image using the mask output layer based on the input convolution feature map and the first intermediate mask map.

Optionally, the mask output layer includes a first output de-convolution sublayer, a second output de-convolution sublayer, a third output de-convolution sublayer, and the output up-sampling sublayer.

In some embodiments, the memory 705 stores computer-executable instructions for controlling the one or more processors 710 to perform an up-sampling operation on the first intermediate mask map using the output up-sampling sublayer; perform a mask construction operation on the input convolution feature map using the first output de-convolution sublayer; perform a mask construction operation on an output from the output up-sampling sublayer using the first output de-convolution sublayer; perform a mask construction operation on an output from the first output de-convolution sublayer using the second output de-convolution sublayer, perform a mask construction operation on an output from the second output de-convolution sublayer using the third output de-convolution sublayer, thereby obtaining the target mask map; and output the target mask map.

Optionally, the mask construction operation further includes an activation operation.

Optionally, the feature input layer includes a first input convolution sublayer, a second input convolution sublayer, and an input down-sampling sublayer.

In some embodiments, the memory 705 stores computer-executable instructions for controlling the one or more processors 710 to perform a first feature extraction operation on the input image using the first input convolution sublayer; perform a second feature extraction operation on an output from the first input convolution sublayer using the second input convolution sublayer to generate the input convolution feature map; output the input convolution feature map to the mask output layer; perform a down-sampling operation on the input convolution feature map using the input down-sampling sublayer to generate the input feature map; and output the input feature map to the first feature middle layer of the feature intermediate layer Optionally, the first feature extraction operation includes a convolution operation and a channel addition operation; and the second feature extraction operation includes a convolution operation.

Optionally, the input image and the input convolution feature map have a same size.

Optionally, the first feature middle layer includes a first intermediate convolution sublayer, a second intermediate convolution sublayer, and an intermediate down-sampling sublayer.

In some embodiments, the memory 705 stores computer-executable instructions for controlling the one or more processors 710 to perform the first feature extraction operation on the input feature map using the first intermediate convolution sublayer; perform the second feature extraction operation on an output from the first intermediate convolution sublayer using the second intermediate convolution sublayer to generate the first intermediate convolution feature map; output the first intermediate convolution feature map to the first mask middle layer, perform a down-sampling operation on the first intermediate convolution feature map using the intermediate down-sampling sublayer to generate the first intermediate feature map; and output the first intermediate feature map to the feature output layer.

Optionally, the input feature map and the first intermediate convolution feature map have a same size.

Optionally, the feature output layer includes an output convolution sublayer.

In some embodiments, the memory 705 stores computer-executable instructions for controlling the one or more processors 710 to perform the first feature extraction operation on the first intermediate feature map using the output convolution sublayer to generate the target feature map; and output the target feature map to the mask input layer.

Optionally, the first intermediate feature map and the target feature map have a same size.

Optionally, each of the first feature extraction operation and the second feature extraction operation further includes an activation operation.

Optionally, the mask intermediate layer includes a first mask middle layer, a second mask middle layer, a third mask middle layer, and a fourth mask middle layer, sequentially connected together. Optionally, the feature intermediate layer includes a first feature middle layer, a second feature middle layer, a third feature middle layer, and a fourth feature middle layer, sequentially connected together. Optionally, the first mask middle layer, the second mask middle layer, the third mask middle layer, and the fourth mask middle layer are respectively connected to the first feature middle layer, the second feature middle layer, the third feature middle layer, and the fourth feature middle layer.

In some embodiments, the memory 705 stores computer-executable instructions for controlling the one or more processors 710 to extract features of the input image using the feature input layer to generate an input feature map; output the input feature map to the first feature middle layer; extract features of the input feature map using the first feature middle layer to generate a first intermediate feature map and a first intermediate convolution feature map; output the first intermediate feature map to the second feature middle layer; output the first intermediate convolution feature map to the first mask middle layer extract features of the first intermediate feature map using the second feature middle layer to generate a second intermediate feature map and a second intermediate convolution feature map; output the second intermediate feature map to the third feature middle layer; output the second intermediate convolution feature map to the second mask middle layer; extract features of the second intermediate feature map using the third feature middle layer to generate a third intermediate feature map and a third intermediate convolution feature map; output the third intermediate feature map to the fourth feature middle layer; output the third intermediate convolution feature map to the third mask middle layer, extract features of the third intermediate feature map using the fourth feature middle layer to generate a fourth intermediate feature map and a fourth intermediate convolution feature map; output the fourth intermediate feature map to the feature output layer; output the fourth intermediate convolution feature map to the fourth mask middle layer extract features of the fourth intermediate feature map using the feature output layer to generate the target feature map; outputting the target feature map to the mask input layer; construct an input mask map using the mask input layer based on the target feature map; output the input mask map to the fourth mask middle layer; construct a fourth intermediate mask map using the fourth mask middle layer based on the fourth intermediate convolution feature map and the input mask map; output the fourth intermediate mask map to the third mask middle layer; construct a third intermediate mask map using the third mask middle layer based on the third intermediate convolution feature map and the fourth intermediate mask map; output the third intermediate mask map to the second mask middle layer; construct a second intermediate mask map using the second mask middle layer based on the second intermediate convolution feature map and the third intermediate mask map; output the second intermediate mask map to the first mask middle layer; construct a first intermediate mask map using the first mask middle layer based on the first intermediate convolution feature map and the second intermediate mask map; and output the first intermediate mask map to the mask output layer.

In some embodiments, the memory 705 and the one or more processors 710 can directly or indirectly communicate with each other. Optionally, the memory 705 and the one or more processors 710 can directly or indirectly communicate with each other via networks including one or a combination of wireless networks and wired networks.

Various appropriate devices having data processing capabilities and/or instruction execution capabilities may be used as the one or more processors 710. Examples of the appropriate devices having data processing capabilities and/or instruction execution capabilities used as the one or more processors 710 include, but not limited to, a central processing unit (CPU), a tensor processor (TPU), or a graphics processor (GPU). Optionally, the CPU can be X86 or ARM architecture. Optionally, the one or more processors 710 can control other devices in the image processing apparatus 70.

In some embodiment, the memory 705 can be a volatile memory or a non-volatile memory. Optionally, the volatile memory can be a random-access memory (RAM) or a cache. Optionally, a non-volatile memory can be a read only memory (ROM), a hard disk, or a flash memory. Optionally, the memory 705 stores computer-executable instructions for controlling the one or more processors 710 to perform functions of the image processing apparatus 70. Optionally, the memory 705 may store various applications and various data, including reference images, reference mask maps or data used or produced by the various applications.

Figure 13:
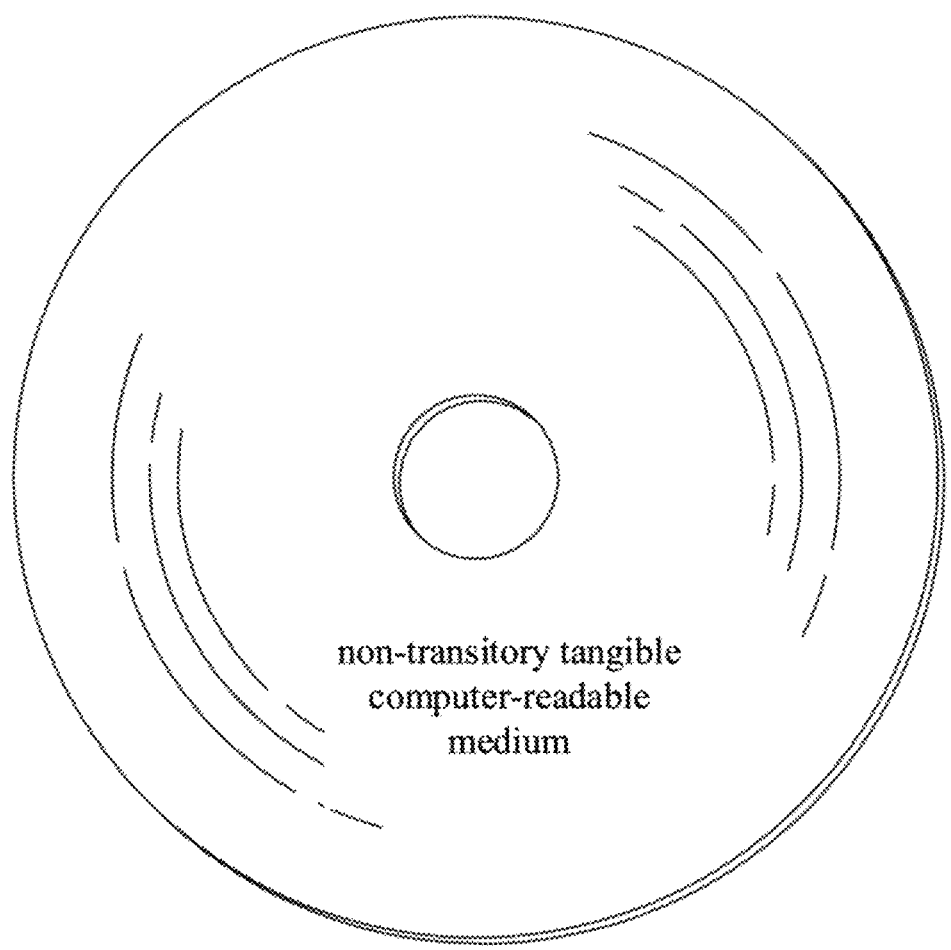
FIG. 13 is a schematic diagram of a non-transitory tangible computer-readable medium in some embodiments according to the present disclosure.

In another aspect, the present disclosure provides computer-program product. FIG. 13 is a schematic diagram of a non-transitory tangible computer-readable medium in some embodiments according to the present disclosure. Referring to FIG. 13, a non-transitory tangible computer-readable medium having computer-readable instructions. In some embodiments, the computer-readable instructions on the non-transitory tangible computer-readable medium being executable by a processor to cause the processor to perform extracting features of an input image using a feature extraction network to generate and output a target feature map of the input image; and constructing and outputting a target mask map of the input image using a mask construction network based on the target feature map. Optionally, the feature extraction network includes a feature input layer, a feature intermediate layer, and a feature output layer sequentially connected together. Optionally, the mask construction network includes a mask input layer, a mask intermediate layer, and a mask output layer sequentially connected together. Optionally, the feature output layer is connected to the mask input layer. Optionally, the feature intermediate layer is connected to the mask intermediate layer. Optionally, the feature input layer is connected to the mask output layer. Optionally, the mask intermediate layer includes an intermediate up-sampling sublayer. Optionally, the mask output layer includes an output up-sampling sublayer. Optionally, each of the intermediate up-sampling sublayer and the output up-sampling sublayer includes an un-pooling layer.

Optionally, the feature intermediate layer includes one or a plurality of feature middle layers sequentially connected together; and the mask intermediate layer includes one or a plurality of mask middle layers sequentially connected together. Optionally, each of the one or the plurality of feature middle layers includes one or a plurality of intermediate convolution sublayers and one or a plurality of intermediate down-sampling sublayers sequentially connected together. Optionally, each of the one or the plurality of mask middle layers includes one or a plurality of intermediate de-convolution sublayers and one or a plurality of intermediate up-sampling sublayers sequentially connected together. Optionally, two corresponding middle layers having a same feature size and respectively from the one or the plurality of feature middle layers and the one or the plurality of mask middle layers are connected to each other.

Optionally, the feature intermediate layer includes a first feature middle layer the mask intermediate layer includes a first mask middle layer; and the first feature middle layer is connected to the first mask middle layer.

In some embodiments, the computer-readable instructions on the non-transitory tangible computer-readable medium being executable by a processor to cause the processor to extract features of the input image using the feature input layer to generate an input feature map and an input convolution feature map; outputting the input feature map to the first feature middle layer; and output the input convolution feature map to the mask output layer; extract feature of the input feature map using the first feature middle layer to generate a first intermediate feature map and a first intermediate convolution feature map; output the first intermediate feature map to the feature output layer, output the first intermediate convolution feature map to the first mask middle layer, extract features of the first intermediate feature map using the feature output layer to generate the target feature map; and output the target feature map to the mask input layer.

Optionally, the mask input layer includes an input de-convolution sublayer.

In some embodiments, the computer-readable instructions on the non-transitory tangible computer-readable medium being executable by a processor to cause the processor to perform a mask construction operation on the target feature map using the input de-convolution sublayer to generate an input mask map, the mask construction operation including a de-convolution operation and a channel reduction operation; and output the input mask map to the first mask middle layer.

In some embodiments, the computer-readable instructions on the non-transitory tangible computer-readable medium being executable by a processor to cause the processor to construct a first intermediate mask map using the first mask middle layer based on the first intermediate convolution feature map and the input mask map; and output the first intermediate mask map to the mask output layer.

Optionally, the first mask middle layer includes a first intermediate de-convolution sublayer, a second intermediate de-convolution sublayer, and the intermediate up-sampling sublayer.

In some embodiments, the computer-readable instructions on the non-transitory tangible computer-readable medium being executable by a processor to cause the processor to perform an up-sampling operation on the input mask map using the intermediate up-sampling sublayer, perform a mask construction operation on the first intermediate convolution feature map using the first intermediate de-convolution sublayer, perform a mask construction operation on an output from the intermediate up-sampling sublayer using the first intermediate de-convolution sublayer; perform a mask construction operation on an output from the first intermediate de-convolution sublayer using the second intermediate de-convolution sublayer to generate the first intermediate mask map.

In some embodiments, the computer-readable instructions on the non-transitory tangible computer-readable medium being executable by a processor to cause the processor to construct and output the target mask map of the input image using the mask output layer based on the input convolution feature map and the first intermediate mask map.

Optionally, the mask output layer includes a first output de-convolution sublayer, a second output de-convolution sublayer, a third output de-convolution sublayer, and the output up-sampling sublayer.

In some embodiments, the computer-readable instructions on the non-transitory tangible computer-readable medium being executable by a processor to cause the processor to perform an up-sampling operation on the first intermediate mask map using the output up-sampling sublayer; perform a mask construction operation on the input convolution feature map using the first output de-convolution sublayer; perform a mask construction operation on an output from the output up-sampling sublayer using the first output de-convolution sublayer; perform a mask construction operation on an output from the first output de-convolution sublayer using the second output de-convolution sublayer, perform a mask construction operation on an output from the second output de-convolution sublayer using the third output de-convolution sublayer, thereby obtaining the target mask map; and output the target mask map.

Optionally, the mask construction operation further includes an activation operation.

Optionally, the feature input layer includes a first input convolution sublayer, a second input convolution sublayer, and an input down-sampling sublayer.

In some embodiments, the computer-readable instructions on the non-transitory tangible computer-readable medium being executable by a processor to cause the processor to perform a first feature extraction operation on the input image using the first input convolution sublayer, perform a second feature extraction operation on an output from the first input convolution sublayer using the second input convolution sublayer to generate the input convolution feature map; output the input convolution feature map to the mask output layer, perform a down-sampling operation on the input convolution feature map using the input down-sampling sublayer to generate the input feature map; and output the input feature map to the first feature middle layer of the feature intermediate layer Optionally, the first feature extraction operation includes a convolution operation and a channel addition operation; and the second feature extraction operation includes a convolution operation.

Optionally, the input image and the input convolution feature map have a same size.

Optionally, the first feature middle layer includes a first intermediate convolution sublayer, a second intermediate convolution sublayer, and an intermediate down-sampling sublayer.

In some embodiments, the computer-readable instructions on the non-transitory tangible computer-readable medium being executable by a processor to cause the processor to perform the first feature extraction operation on the input feature map using the first intermediate convolution sublayer; perform the second feature extraction operation on an output from the first intermediate convolution sublayer using the second intermediate convolution sublayer to generate the first intermediate convolution feature map; output the first intermediate convolution feature map to the first mask middle layer, perform a down-sampling operation on the first intermediate convolution feature map using the intermediate down-sampling sublayer to generate the first intermediate feature map; and output the first intermediate feature map to the feature output layer.

Optionally, the input feature map and the first intermediate convolution feature map have a same size.

Optionally, the feature output layer includes an output convolution sublayer.

In some embodiments, the computer-readable instructions on the non-transitory tangible computer-readable medium being executable by a processor to cause the processor to perform the first feature extraction operation on the first intermediate feature map using the output convolution sublayer to generate the target feature map; and output the target feature map to the mask input layer.

Optionally, the first intermediate feature map and the target feature map have a same size.

Optionally, each of the first feature extraction operation and the second feature extraction operation further includes an activation operation.

Optionally, the mask intermediate layer includes a first mask middle layer, a second mask middle layer, a third mask middle layer, and a fourth mask middle layer, sequentially connected together. Optionally, the feature intermediate layer includes a first feature middle layer, a second feature middle layer, a third feature middle layer, and a fourth feature middle layer, sequentially connected together. Optionally, the first mask middle layer, the second mask middle layer, the third mask middle layer, and the fourth mask middle layer are respectively connected to the first feature middle layer, the second feature middle layer, the third feature middle layer, and the fourth feature middle layer.

In some embodiments, the computer-readable instructions on the non-transitory tangible computer-readable medium being executable by a processor to cause the processor to extract features of the input image using the feature input layer to generate an input feature map; output the input feature map to the first feature middle layer, extract features of the input feature map using the first feature middle layer to generate a first intermediate feature map and a first intermediate convolution feature map; output the first intermediate feature map to the second feature middle layer; output the first intermediate convolution feature map to the first mask middle layer, extract features of the first intermediate feature map using the second feature middle layer to generate a second intermediate feature map and a second intermediate convolution feature map; output the second intermediate feature map to the third feature middle layer; output the second intermediate convolution feature map to the second mask middle layer, extract features of the second intermediate feature map using the third feature middle layer to generate a third intermediate feature map and a third intermediate convolution feature map; output the third intermediate feature map to the fourth feature middle layer, output the third intermediate convolution feature map to the third mask middle layer, extract features of the third intermediate feature map using the fourth feature middle layer to generate a fourth intermediate feature map and a fourth intermediate convolution feature map; output the fourth intermediate feature map to the feature output layer, output the fourth intermediate convolution feature map to the fourth mask middle layer; extract features of the fourth intermediate feature map using the feature output layer to generate the target feature map;

outputting the target feature map to the mask input layer; construct an input mask map using the mask input layer based on the target feature map; output the input mask map to the fourth mask middle layer, construct a fourth intermediate mask map using the fourth mask middle layer based on the fourth intermediate convolution feature map and the input mask map; output the fourth intermediate mask map to the third mask middle layer; construct a third intermediate mask map using the third mask middle layer based on the third intermediate convolution feature map and the fourth intermediate mask map; output the third intermediate mask map to the second mask middle layer, construct a second intermediate mask map using the second mask middle layer based on the second intermediate convolution feature map and the third intermediate mask map; output the second intermediate mask map to the first mask middle layer; construct a first intermediate mask map using the first mask middle layer based on the first intermediate convolution feature map and the second intermediate mask map; and output the first intermediate mask map to the mask output layer.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An image processing method, comprising:
    extracting features of an input image using a feature extraction network to generate and output a target feature map of the input image; and
    constructing and outputting a target mask map of the input image using a mask construction network based on the target feature map;
    wherein the feature extraction network comprises a feature input layer, a feature intermediate layer, and a feature output layer sequentially connected together;
    the mask construction network comprises a mask input layer, a mask intermediate layer, and a mask output layer sequentially connected together;
    the feature output layer is connected to the mask input layer;
    the feature intermediate layer is connected to the mask intermediate layer; and
    the feature input layer is connected to the mask output layer.

2. The image processing method of claim 1, wherein the mask intermediate layer comprises an intermediate up-sampling sublayer; and
    the mask output layer comprises an output up-sampling sublayer.

3. The image processing method of claim 2, wherein each of the intermediate up-sampling sublayer and the output up-sampling sublayer comprises an un-pooling layer.

4. The image processing method of claim 1, wherein the feature intermediate layer comprises one or a plurality of feature middle layers sequentially connected together;
    the mask intermediate layer comprises one or a plurality of mask middle layers sequentially connected together;
    each of the one or the plurality of feature middle layers comprises one or a plurality of intermediate convolution sublayers and one or a plurality of intermediate down-sampling sublayers sequentially connected together;
    each of the one or the plurality of mask middle layers comprises one or a plurality of intermediate de-convolution sublayers and one or a plurality of intermediate up-sampling sublayers sequentially connected together; and
    two corresponding middle layers having a same feature size and respectively from the one or the plurality of feature middle layers and the one or the plurality of mask middle layers are connected to each other.

5. The image processing method of claim 4, wherein the feature intermediate layer comprises a first feature middle layer;
    the mask intermediate layer comprises a first mask middle layer; and
    the first feature middle layer is connected to the first mask middle layer;
    wherein extracting features of the input image comprises:
    extracting features of the input image using the feature input layer to generate an input feature map and an input convolution feature map;
    outputting the input feature map to the first feature middle layer; and
    outputting the input convolution feature map to the mask output layer;

extracting feature of the input feature map using the first feature middle layer to generate a first intermediate feature map and a first intermediate convolution feature map;

outputting the first intermediate feature map to the feature output layer;

outputting the first intermediate convolution feature map to the first mask middle layer;

extracting features of the first intermediate feature map using the feature output layer to generate the target feature map; and outputting the target feature map to the mask input layer.

6. The image processing method of claim 5, wherein the mask input layer comprising an input de-convolution sublayer;

the method comprises:

performing a mask construction operation on the target feature map using the input de-convolution sublayer to generate an input mask map, the mask construction operation comprising a de-convolution operation and a channel reduction operation; and outputting the input mask map to the first mask middle layer.

7. The image processing method of claim 6, further comprising:

constructing a first intermediate mask map using the first mask middle layer based on the first intermediate convolution feature map and the input mask map; and outputting the first intermediate mask map to the mask output layer.

8. The image processing method of claim 7, wherein the first mask middle layer comprises a first intermediate de-convolution sublayer, a second intermediate de-convolution sublayer, and an intermediate up-sampling sublayer;

wherein the method comprises:

performing an up-sampling operation on the input mask map using the intermediate up-sampling sublayer;

performing a mask construction operation on the first intermediate convolution feature map and an output from the intermediate up-sampling sublayer using the first intermediate de-convolution sublayer; and performing a mask construction operation on an output from the first intermediate de-convolution sublayer using the second intermediate de-convolution sublayer to generate the first intermediate mask map.

9. The image processing method of claim 8, further comprising constructing and outputting the target mask map of the input image using the mask output layer based on the input convolution feature map and the first intermediate mask map.

10. The image processing method of claim 9, wherein the mask output layer comprises a first output de-convolution sublayer, a second output de-convolution sublayer, a third output de-convolution sublayer, and an output up-sampling sublayer;

the method comprising:

performing an up-sampling operation on the first intermediate mask map using the output up-sampling sublayer;

performing a mask construction operation on the input convolution feature map using the first output de-convolution sublayer;

performing a mask construction operation on an output from the output up-sampling sublayer using the first output de-convolution sublayer;

performing a mask construction operation on an output from the first output de-convolution sublayer using the second output de-convolution sublayer;

performing a mask construction operation on an output from the second output de-convolution sublayer using the third output de-convolution sublayer, thereby obtaining the target mask map; and outputting the target mask map.

11. The image processing method of claim 6, wherein the mask construction operation further comprises an activation operation.

12. The image processing method of claim 5, wherein the feature input layer comprises a first input convolution sublayer, a second input convolution sublayer, and an input down-sampling sublayer;

the method comprising:

performing a first feature extraction operation on the input image using the first input convolution sublayer;

performing a second feature extraction operation on an output from the first input convolution sublayer using the second input convolution sublayer to generate the input convolution feature map;

outputting the input convolution feature map to the mask output layer;

performing a down-sampling operation on the input convolution feature map using the input down-sampling sublayer to generate the input feature map; and outputting the input feature map to the first feature middle layer of the feature intermediate layer;

wherein the first feature extraction operation comprises a convolution operation and a channel addition operation; and the second feature extraction operation comprises a convolution operation.

13. The image processing method of claim 12, wherein the first feature middle layer comprises a first intermediate convolution sublayer, a second intermediate convolution sublayer, and an intermediate down-sampling sublayer;

the method comprising:

performing the first feature extraction operation on the input feature map using the first intermediate convolution sublayer;

performing the second feature extraction operation on an output from the first intermediate convolution sublayer using the second intermediate convolution sublayer to generate the first intermediate convolution feature map;

outputting the first intermediate convolution feature map to the first mask middle layer;

performing a down-sampling operation on the first intermediate convolution feature map using the intermediate down-sampling sublayer to generate the first intermediate feature map; and outputting the first intermediate feature map to the feature output layer.

14. The image processing method of claim 13, wherein the feature output layer comprises an output convolution sublayer;

the method comprising:

performing the first feature extraction operation on the first intermediate feature map using the output convolution sublayer to generate the target feature map; and outputting the target feature map to the mask input layer.

15. The image processing method of claim 12, wherein each of the first feature extraction operation and the second feature extraction operation further comprises an activation operation.

16. The image processing method of claim 4, wherein the mask intermediate layer comprises a first mask middle layer, a second mask middle layer, a third mask middle layer, and a fourth mask middle layer, sequentially connected together;

the feature intermediate layer comprises a first feature middle layer, a second feature middle layer, a third feature middle layer, and a fourth feature middle layer, sequentially connected together; and the first mask middle layer, the second mask middle layer, the third mask middle layer, and the fourth mask middle layer are respectively connected to the first feature middle layer, the second feature middle layer, the third feature middle layer, and the fourth feature middle layer.

17. The image processing method of claim 16, further comprising:

extracting features of the input image using the feature input layer to generate an input feature map;

outputting the input feature map to the first feature middle layer;

extracting features of the input feature map using the first feature middle layer to generate a first intermediate feature map and a first intermediate convolution feature map;

outputting the first intermediate feature map to the second feature middle layer;

outputting the first intermediate convolution feature map to the first mask middle layer;

extracting features of the first intermediate feature map using the second feature middle layer to generate a second intermediate feature map and a second intermediate convolution feature map;

outputting the second intermediate feature map to the third feature middle layer;

outputting the second intermediate convolution feature map to the second mask middle layer;

extracting features of the second intermediate feature map using the third feature middle layer to generate a third intermediate feature map and a third intermediate convolution feature map;

outputting the third intermediate feature map to the fourth feature middle layer;

outputting the third intermediate convolution feature map to the third mask middle layer;

extracting features of the third intermediate feature map using the fourth feature middle layer to generate a fourth intermediate feature map and a fourth intermediate convolution feature map;

outputting the fourth intermediate feature map to the feature output layer;

outputting the fourth intermediate convolution feature map to the fourth mask middle layer;

extracting features of the fourth intermediate feature map using the feature output layer to generate the target feature map;

outputting the target feature map to the mask input layer;

constructing an input mask map using the mask input layer based on the target feature map;

outputting the input mask map to the fourth mask middle layer;

constructing a fourth intermediate mask map using the fourth mask middle layer based on the fourth intermediate convolution feature map and the input mask map;

outputting the fourth intermediate mask map to the third mask middle layer;

constructing a third intermediate mask map using the third mask middle layer based on the third intermediate convolution feature map and the fourth intermediate mask map;

outputting the third intermediate mask map to the second mask middle layer;

constructing a second intermediate mask map using the second mask middle layer based on the second intermediate convolution feature map and the third intermediate mask map;

outputting the second intermediate mask map to the first mask middle layer;

constructing a first intermediate mask map using the first mask middle layer based on the first intermediate convolution feature map and the second intermediate mask map; and outputting the first intermediate mask map to the mask output layer.

18. The image processing method of claim 1, further comprising training the feature extraction network and the mask construction network using reference images and reference mask maps corresponding to the reference images;

wherein a loss function for training the feature extraction network and the mask construction network comprising one or a combination of a Dyce similarity coefficient function and an intersection ratio function.

19. An image processing apparatus, comprising:

a memory; and one or more processors;

wherein the memory and the one or more processors are connected with each other; and the memory stores computer-executable instructions for controlling the one or more processors to:

extract features of an input image using a feature extraction network to generate and output a target feature map of the input image; and construct and outputting a target mask map of the input image using a mask construction network based on the target feature map;

wherein the feature extraction network comprises a feature input layer, a feature intermediate layer, and a feature output layer sequentially connected together;

the mask construction network comprises a mask input layer, a mask intermediate layer, and a mask output layer sequentially connected together;

the feature output layer is connected to the mask input layer;

the feature intermediate layer is connected to the mask intermediate layer; and the feature input layer is connected to the mask output layer.

20. A computer-program product comprising a non-transitory tangible computer-readable medium having computer-readable instructions thereon, the computer-readable instructions being executable by a processor to cause the processor to perform:

extracting features of an input image using a feature extraction network to generate and output a target feature map of the input image; and constructing and outputting a target mask map of the input image using a mask construction network based on the target feature map;

wherein the feature extraction network comprises a feature input layer, a feature intermediate layer, and a feature output layer sequentially connected together;

the mask construction network comprises a mask input layer, a mask intermediate layer, and a mask output layer sequentially connected together;

the feature output layer is connected to the mask input layer;

the feature intermediate layer is connected to the mask intermediate layer; and the feature input layer is connected to the mask output layer.

* * * * *